United States Patent
Kurita et al.

(10) Patent No.: US 11,108,951 B2
(45) Date of Patent: Aug. 31, 2021

(54) IMAGE CAPTURING DEVICE AND IMAGING ELEMENT, AND IMAGE PROCESSING METHOD

(71) Applicant: SONY CORPORATION, Tokyo (JP)

(72) Inventors: Teppei Kurita, Tokyo (JP); Shun Kaizu, Kanagawa (JP); Yasutaka Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 15 days.

(21) Appl. No.: 16/619,170

(22) PCT Filed: Apr. 9, 2018

(86) PCT No.: PCT/JP2018/014915
§ 371 (c)(1),
(2) Date: Dec. 4, 2019

(87) PCT Pub. No.: WO2018/230119
PCT Pub. Date: Dec. 20, 2018

(65) Prior Publication Data
US 2020/0204729 A1 Jun. 25, 2020

(30) Foreign Application Priority Data
Jun. 13, 2017 (JP) .............................. JP2017-115755

(51) Int. Cl.
*H04N 5/232* (2006.01)
*H04N 5/235* (2006.01)
(Continued)

(52) U.S. Cl.
CPC ......... *H04N 5/23229* (2013.01); *H04N 5/341* (2013.01)

(58) Field of Classification Search
None
See application file for complete search history.

(56) References Cited

U.S. PATENT DOCUMENTS

2010/0282945 A1 11/2010 Yokogawa
2014/0253756 A1 9/2014 Yokogawa
(Continued)

FOREIGN PATENT DOCUMENTS

CN 101887900 A 11/2010
EP 2252069 A2 11/2010
(Continued)

OTHER PUBLICATIONS

International Search Report and Written Opinion of PCT Application No. PCT/JP2018/014915, dated May 22, 2018, 08 pages of ISRWO.

(Continued)

*Primary Examiner* — Mark T Monk
(74) *Attorney, Agent, or Firm* — Chip Law Group

(57) ABSTRACT

In an image capturing unit 20, an imaging element has a 4×4-pixel area in which: pixels including at least one pixel of every color component of a plurality of color components are polarization pixels of the same polarization direction; and pixels which are not the polarization pixels constitute a majority of the 4×4-pixel area, and are non-polarization pixels. The unpolarized component calculating unit 31 of the image processing unit 30 calculates unpolarized components for each pixel and for each color component by using pixel signals of polarization pixels, and pixel signals of non-polarization pixels that are generated at the image capturing unit 20. The diffuse reflection component calculating unit 32 calculates diffuse reflection components for each pixel and for each color component by using pixel signals of polarization pixels, and pixel signals of non-polarization pixels that are generated at the image capturing unit 20.

20 Claims, 22 Drawing Sheets

(51) Int. Cl.
*H04N 9/04* (2006.01)
*H04N 5/341* (2011.01)

(56) References Cited

U.S. PATENT DOCUMENTS

| | | | |
|---|---|---|---|
| 2015/0141753 A1* | 5/2015 | Kanamori | A61B 1/00009 600/109 |
| 2016/0190193 A1 | 6/2016 | Yokogawa | |
| 2017/0221949 A1 | 8/2017 | Yokogawa | |

FOREIGN PATENT DOCUMENTS

| | | |
|---|---|---|
| JP | 2010-263158 A | 11/2010 |
| JP | 2013-148505 A | 8/2013 |
| JP | 2017-017563 A | 1/2017 |
| KR | 10-2010-0122058 A | 11/2010 |
| TW | 201106470 A | 2/2011 |
| WO | 2017/002715 A1 | 1/2017 |

OTHER PUBLICATIONS

Office Action for JP Patent Application No. 2019-525132, dated May 25, 2021, 3 pages of English Translation and 3 pages of Office Action.

* cited by examiner

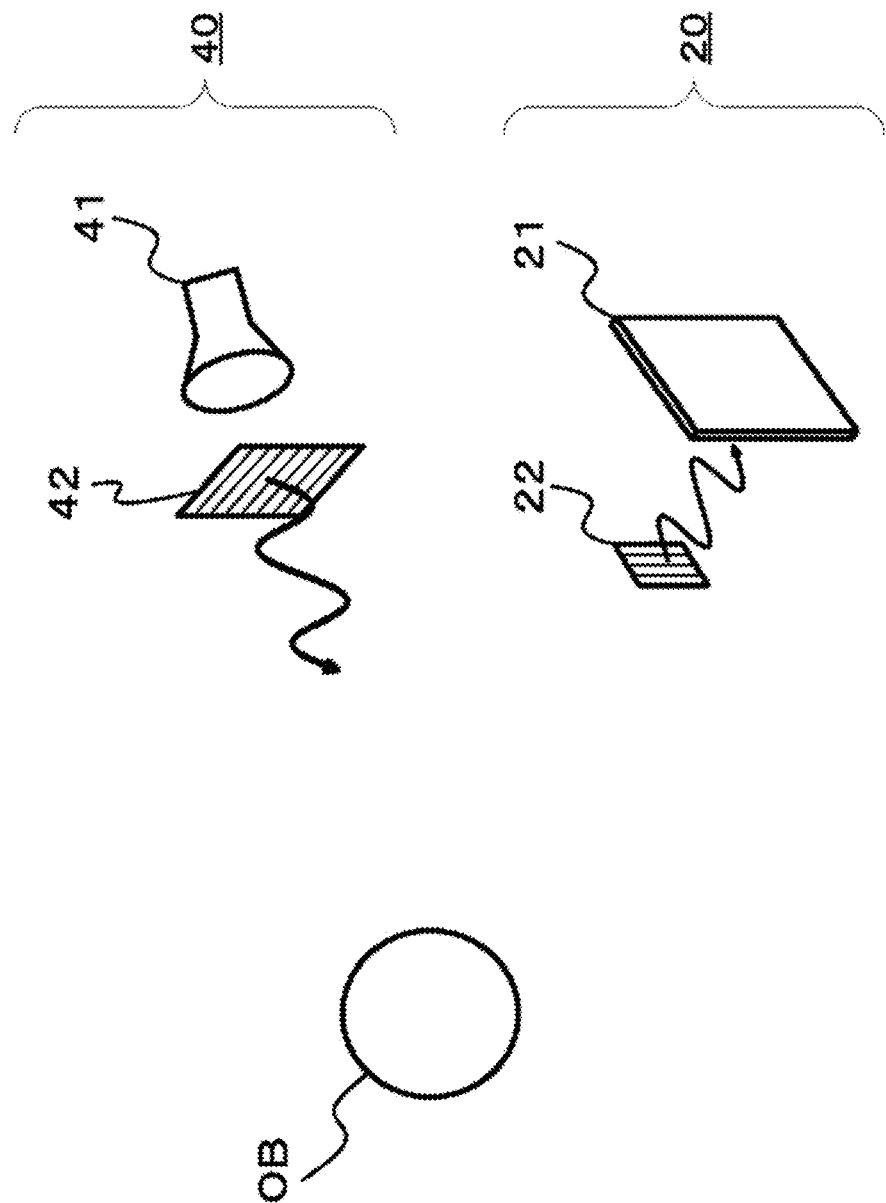

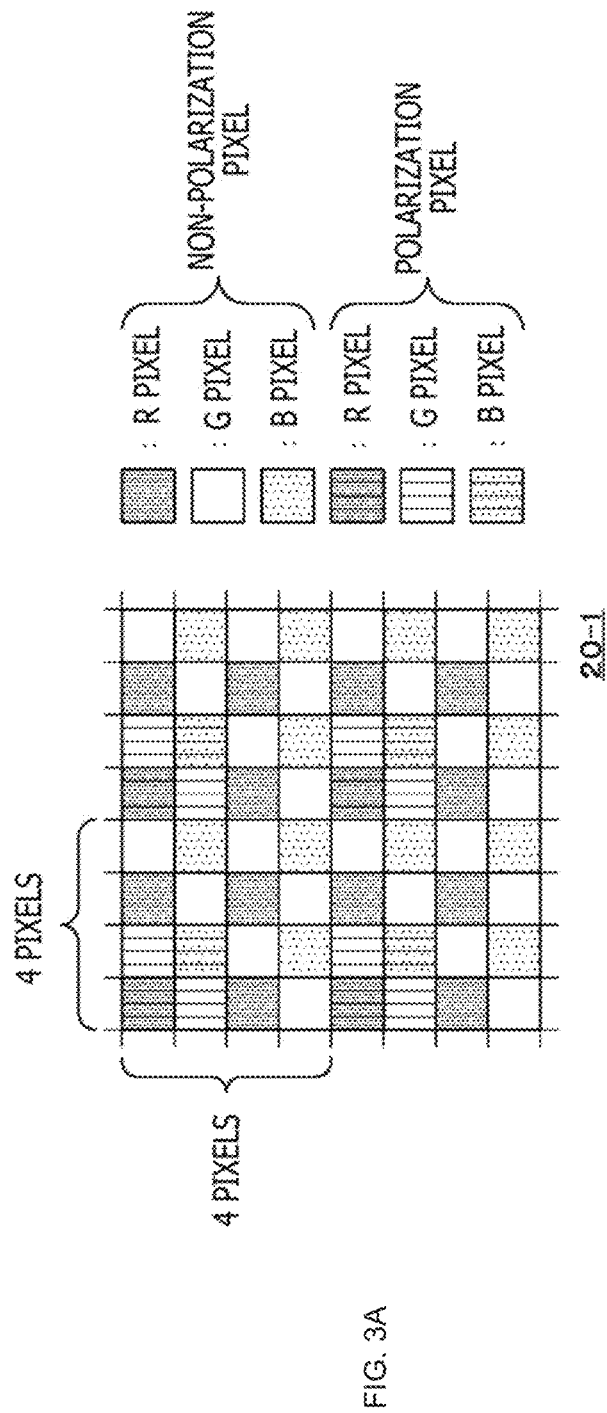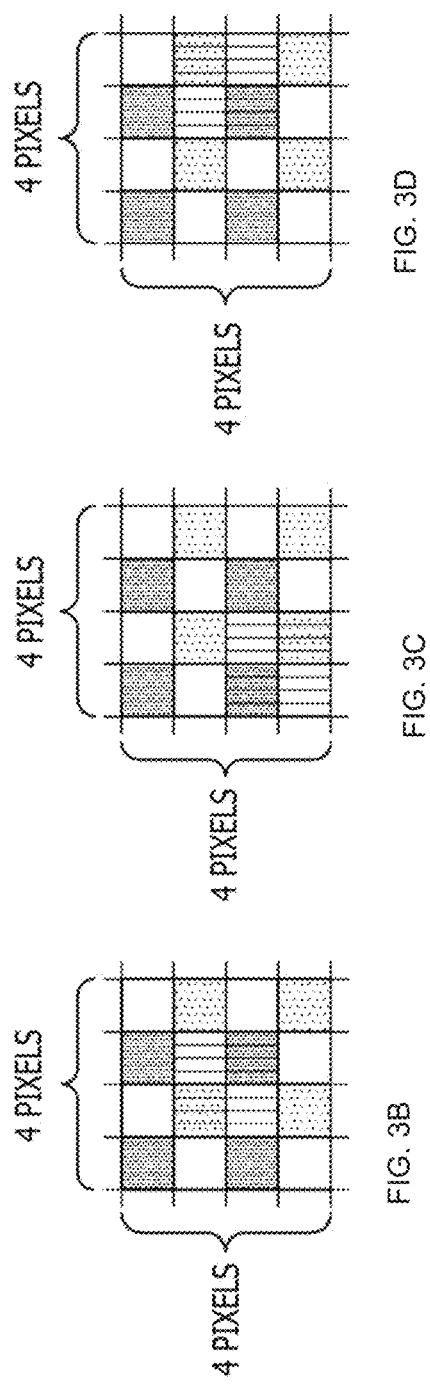
FIG. 3A FIG. 3B FIG. 3C FIG. 3D

FIG.4

| 1 | 4 | 8 | 12 | 14 | 12 | 8 | 4 | 1 |
|---|---|---|---|---|---|---|---|---|
| 4 | 16 | 32 | 48 | 56 | 48 | 32 | 16 | 4 |
| 8 | 32 | 64 | 96 | 112 | 96 | 64 | 32 | 8 |
| 12 | 48 | 96 | 144 | 168 | 144 | 96 | 48 | 12 |
| 14 | 56 | 112 | 168 | 196 | 168 | 112 | 56 | 14 |
| 12 | 48 | 96 | 144 | 168 | 144 | 96 | 48 | 12 |
| 8 | 32 | 64 | 96 | 112 | 96 | 64 | 32 | 8 |
| 4 | 16 | 32 | 48 | 56 | 48 | 32 | 16 | 4 |
| 1 | 4 | 8 | 12 | 14 | 12 | 8 | 4 | 1 |

FIG. 5
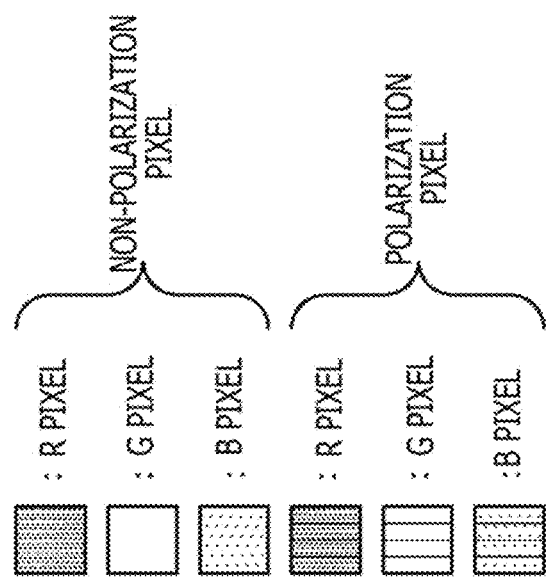
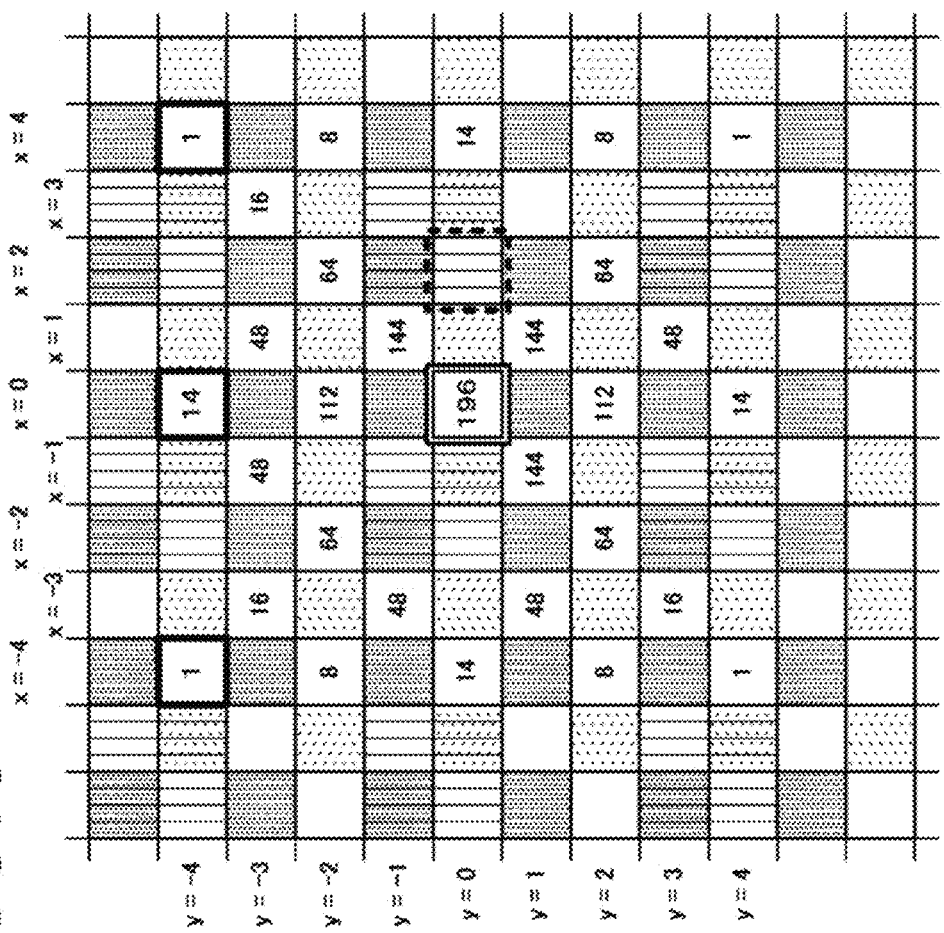

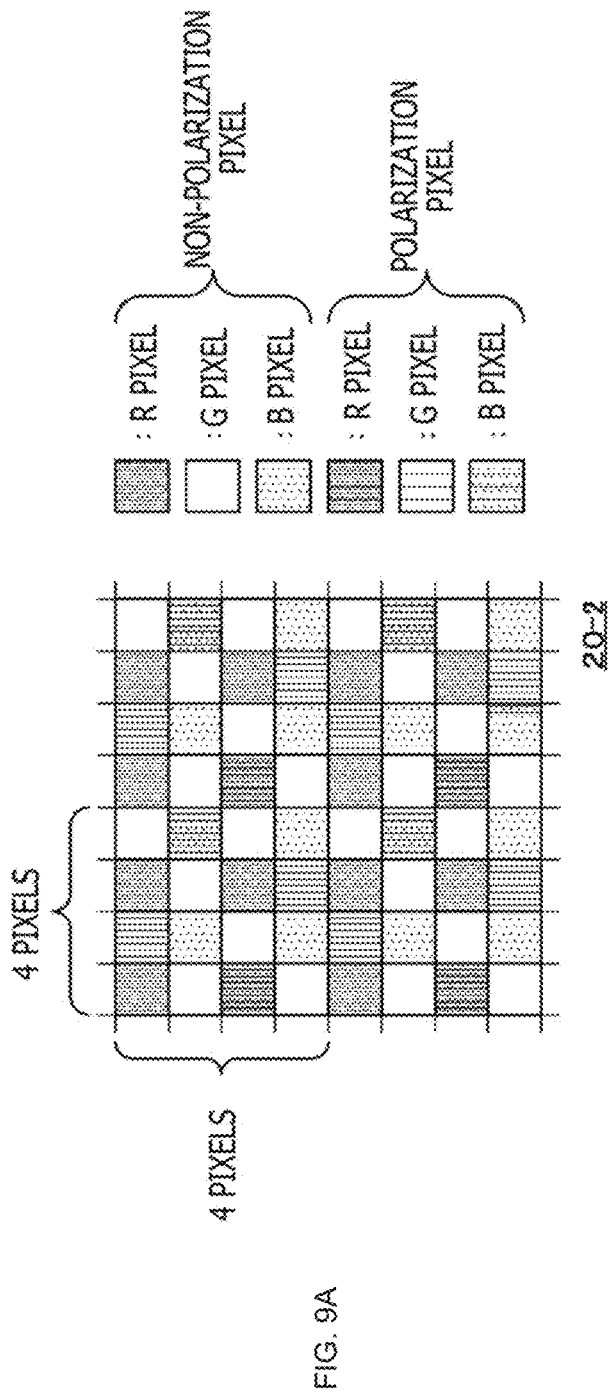
FIG. 9A
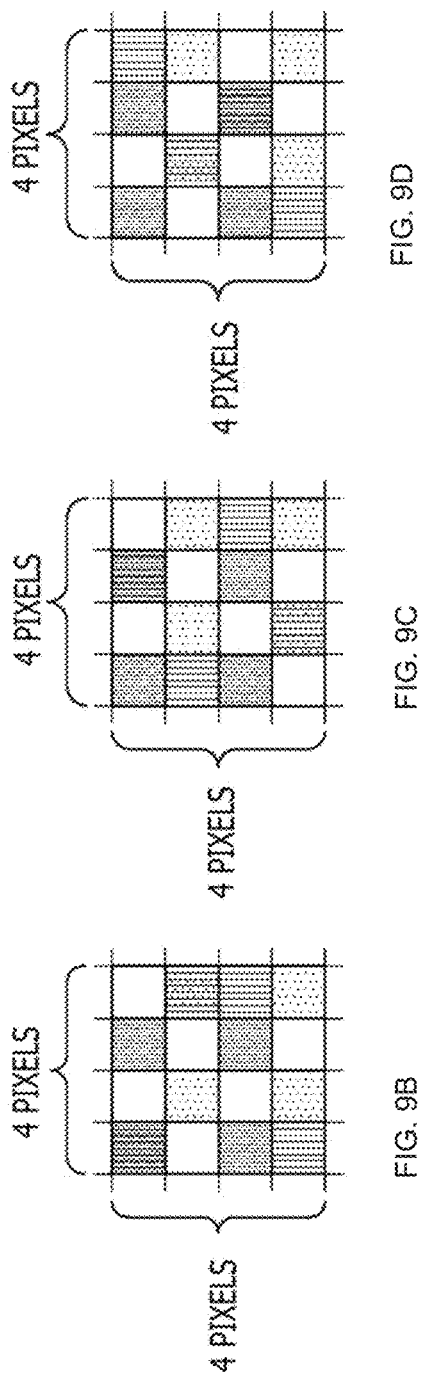
FIG. 9B
FIG. 9C
FIG. 9D

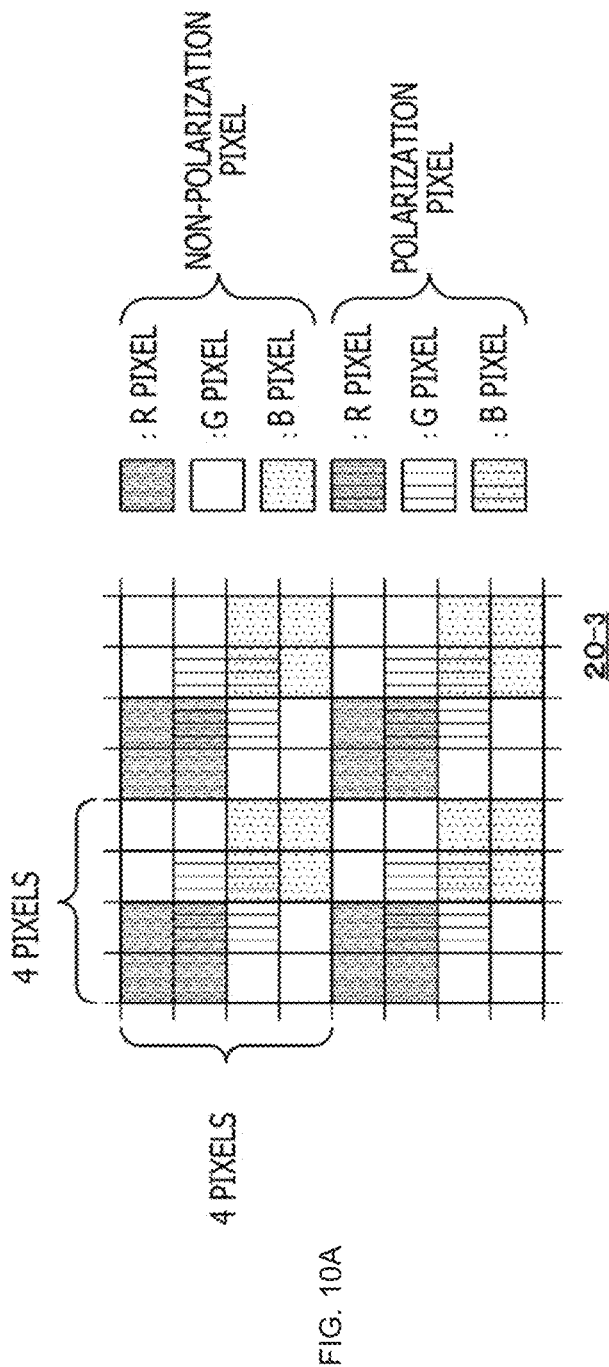
FIG. 10A
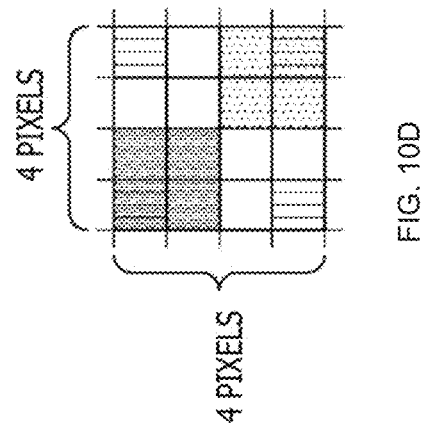
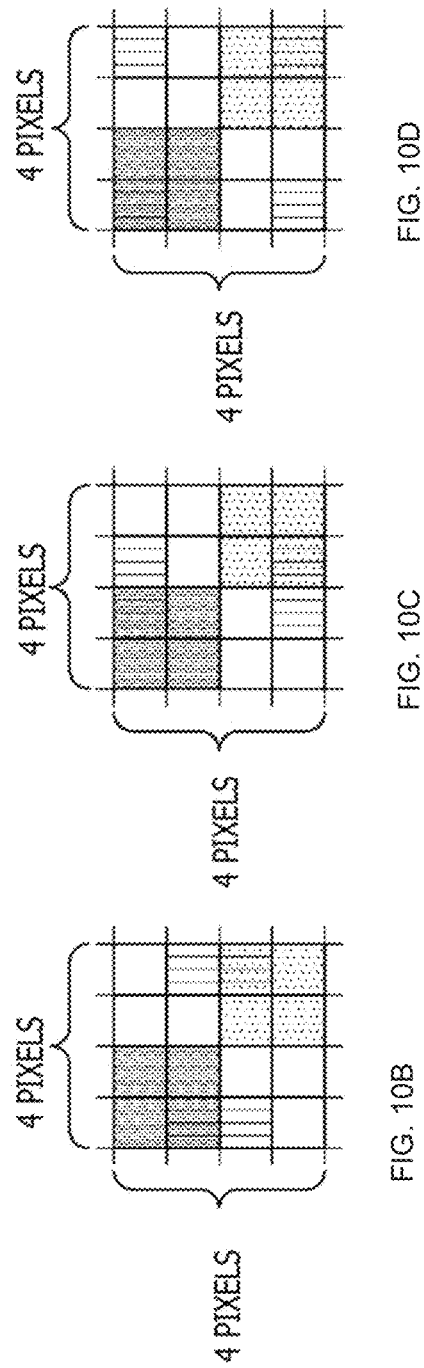
FIG. 10B
FIG. 10C
FIG. 10D

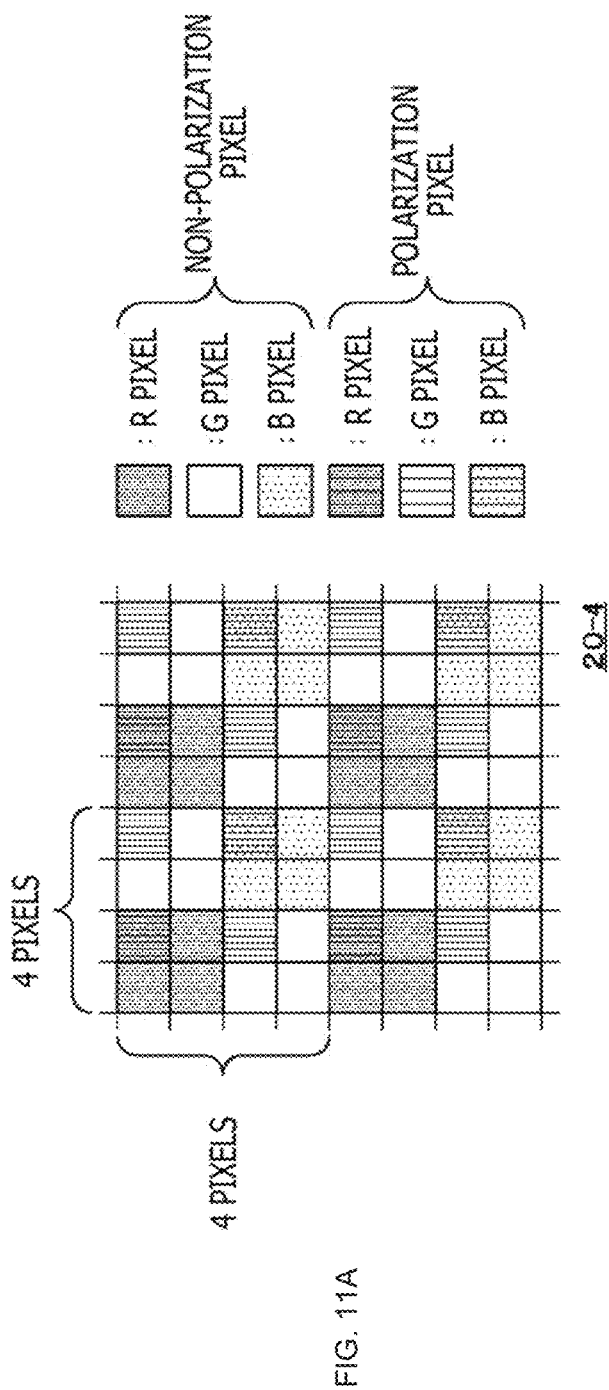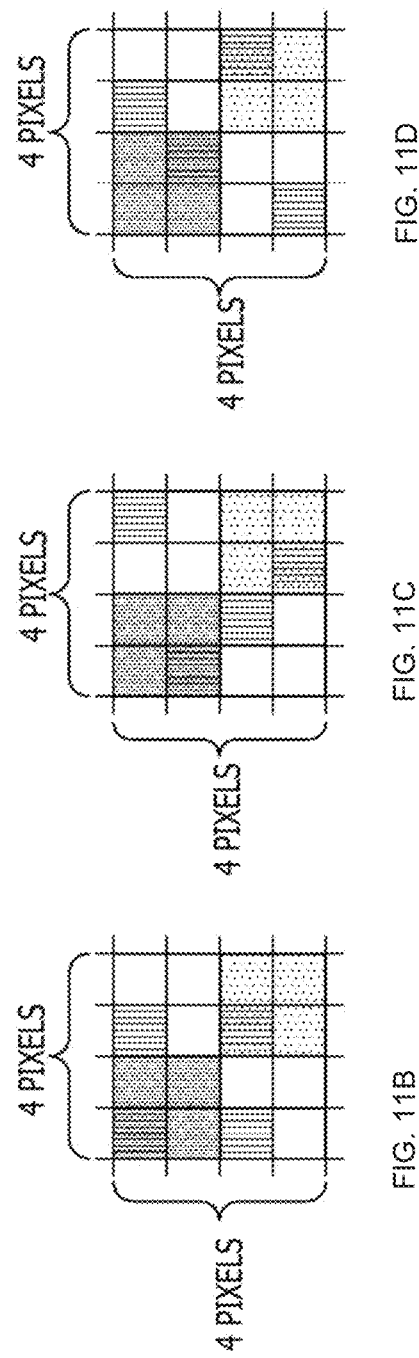
FIG. 11A
FIG. 11B
FIG. 11C
FIG. 11D

FIG. 15

| | CONVENTIONAL SENSOR (WITH NO POLARIZATION PIXEL) | PRIOR ART | | | | | PRESENT TECHNIQUE | | | | |
|---|---|---|---|---|---|---|---|---|---|---|---|
| | | FIRST EMBODIMENT | SECOND EMBODIMENT | THIRD EMBODIMENT | FOURTH EMBODIMENT | FIFTH EMBODIMENT | FIRST EMBODIMENT | SECOND EMBODIMENT | THIRD EMBODIMENT | FOURTH EMBODIMENT | FIFTH EMBODIMENT |
| SENSITIVITY | 1 | 0.875 | 0.75 | 0.5 | 0.875 | 0.75 | 0.875 | 0.875 | 0.875 | 0.875 | ≧0.968 |
| SEPARATION OF G REFLECTION COMPONENT | × | ○ | ○ | ○ | ○ | ○ | ○ | ○ | ○ | ○ | ○ |
| SEPARATION OF R AND B REFLECTION COMPONENTS | × | × | × | × | × | ○ | ○ | ○ | ○ | ○ | ○ |

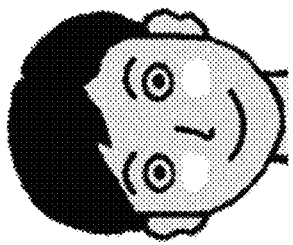
FIG. 16D [α=0.2, β=1]
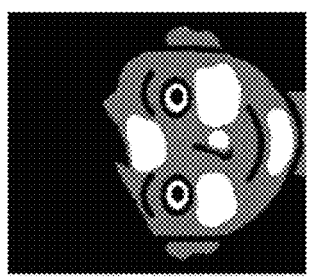
FIG. 16C [α=1, β=0]
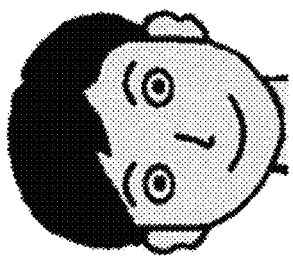
FIG. 16B [α=0, β=1]
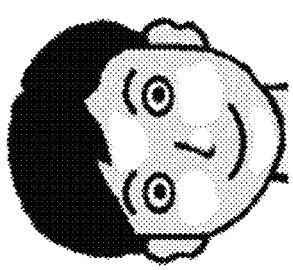
FIG. 16A [α=1, β=1]

α : FIXED
β : LOW

α : FIXED
β : HIGH

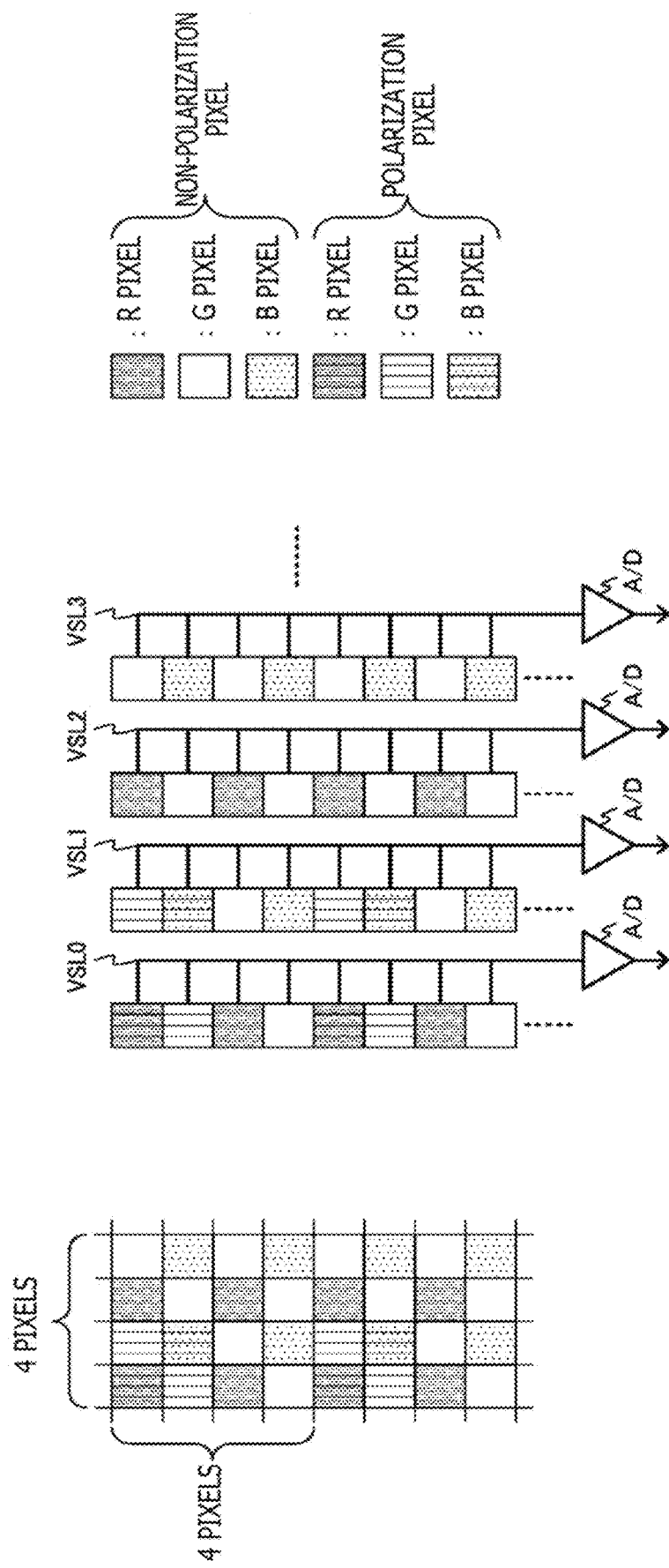

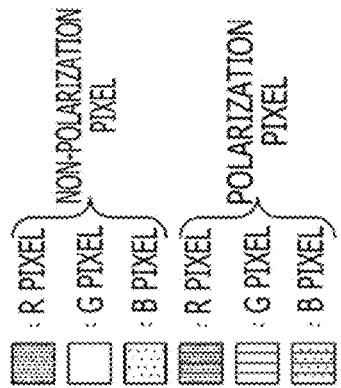
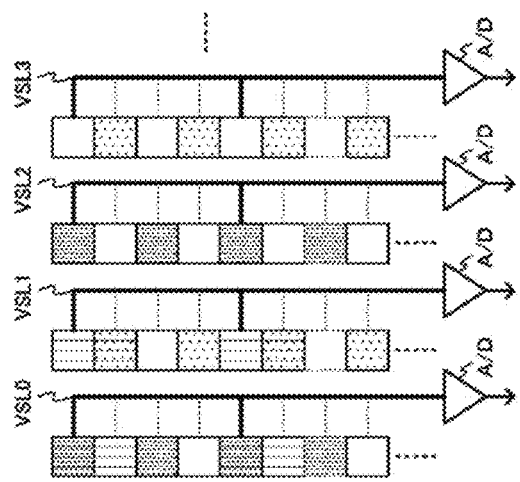
FIG. 20A
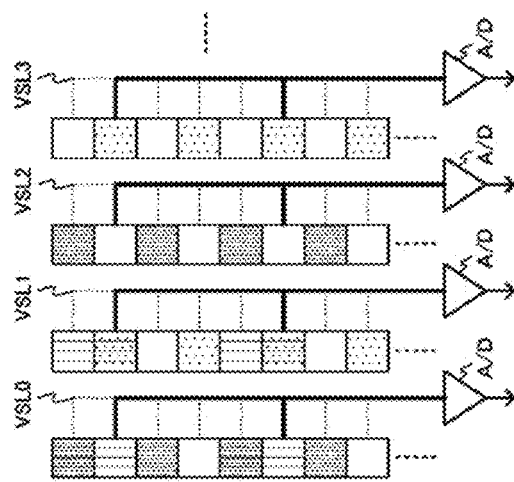
FIG. 20B
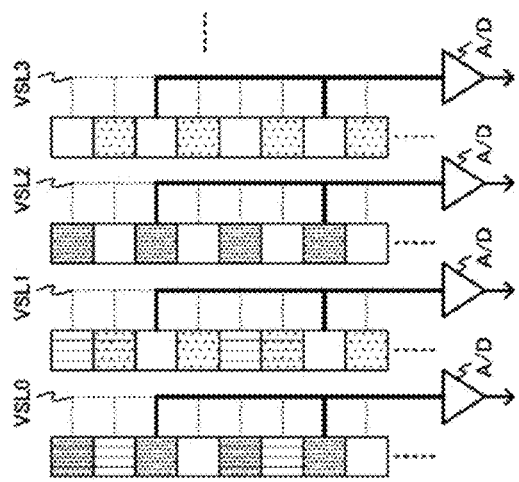
FIG. 20C
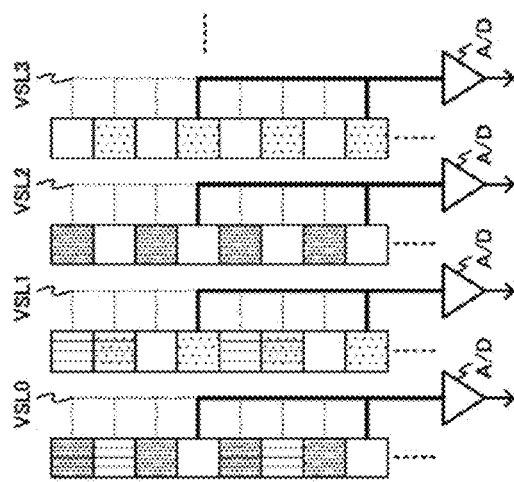
FIG. 20D

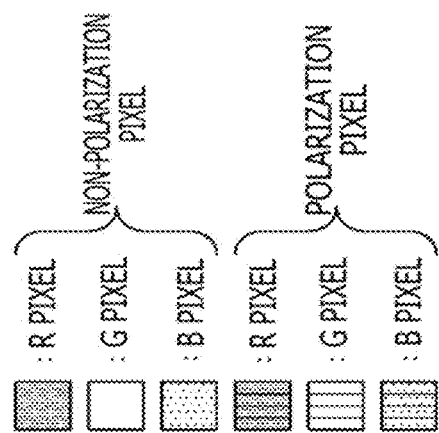
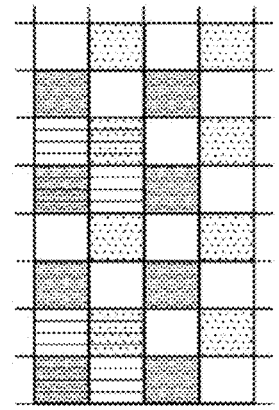
FIG. 21B
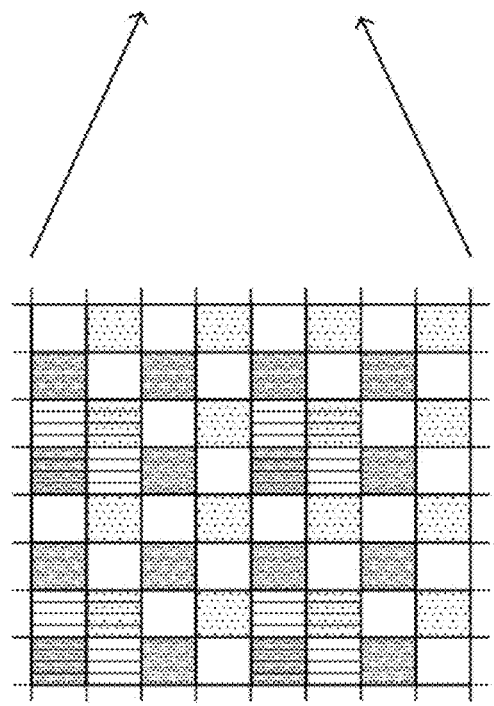
FIG. 21A

IMAGE CAPTURING DEVICE AND IMAGING ELEMENT, AND IMAGE PROCESSING METHOD

CROSS REFERENCE TO RELATED APPLICATIONS

This application is a U.S. National Phase of International Patent Application No. PCT/JP2018/014915 filed on Apr. 9, 2018, which claims priority benefit of Japanese Patent Application No. JP 2017-115755 filed in the Japan Patent Office on Jun. 13, 2017. Each of the above-referenced applications is hereby incorporated herein by reference in its entirety.

TECHNICAL FIELD

This technique relates to an image capturing device and an imaging element, and an image processing method, and enables acquisition of non-polarization images with high resolution and sensitivity, and reflection components for each color component.

BACKGROUND

There is a conventional image capturing device proposed as a device to be able to acquire not only color images, but also polarization images. For example, in a technique disclosed in PTL 1, an optical filter having a polarization filter layer is arranged before a Bayer array imaging element. Illustrated are configurations of the polarization filter layer including: a configuration in which a polarizer is formed for allowing either a horizontally polarized component or a vertically polarized component of incoming light to enter only one of two G pixels (green pixels) included in a pixel group including four pixels that are adjacent to each other in two perpendicular directions along pixel array directions; a configuration in which a polarizer is formed for allowing a horizontally polarized component of incoming light to enter one of two G pixels, and a polarizer is formed for allowing a vertically polarized component of the incoming light to enter the other of the two G pixels; and a configuration in which, in the configuration described secondarily above, a polarizer is formed for allowing a horizontally polarized component of the incoming light to enter an R pixel (red pixel), and a B pixel (blue pixel). In addition, illustrated is a configuration in which a polarizer for allowing a horizontally polarized component of incoming light to enter one of two G pixels included in one pixel group, a polarizer for allowing a vertically polarized component of the incoming light to enter G pixels which are one-pixel apart from the one G pixel in two perpendicular directions along pixel array directions, and a polarizer for allowing the horizontally polarized component of the incoming light to enter G pixels which are one-pixel apart from the one G pixel in diagonal directions are formed at regular pitches, with a set of four pixel groups that are adjacent to each other in the two perpendicular directions being treated as one unit. Furthermore, also illustrated is a configuration in which polarizers for allowing entrance of either horizontally polarized components or vertically polarized components of incoming light are formed in a stripe-like pattern. Color-by-color pixel values generated in an imaging element having an optical filter having such a polarization filter layer disposed in a front stage thereof are used to generate horizontally polarized component images, vertically polarized component images, color images and the like.

CITATION LIST

Patent Literature

[PTL 1]
Japanese Patent Laid-open No. 2013-148505

SUMMARY

Technical Problems

Meanwhile, red reflection components, and blue reflection components cannot be acquired with configurations like the one illustrated in PTL 1 in which polarizers are provided only in G pixels. In addition, the configuration in which polarizers are provided in two G pixels, one red pixel, and one blue pixel in a pixel group lowers the sensitivity at each pixel. Furthermore, the configuration in which polarizers are formed in a stripe-like pattern deteriorates the resolution of non-polarization pixels in a direction orthogonal to the direction of the stripe.

In view of this, an object of this technique is to provide an image capturing device and an imaging element, and an image processing method that enable acquisition of non-polarization images with high resolution and sensitivity, and reflection components for each color component.

Solution to Problems

A first aspect of this technique lies in an image capturing device including:

an image capturing unit having an imaging element with a 4×4-pixel area in which pixels including at least one pixel of every color component of a plurality of color components are polarization pixels of the same polarization direction, and pixels which are not the polarization pixels constitute a majority of the 4×4-pixel area, and are non-polarization pixels; and an image processing unit which uses pixel signals of the polarization pixels, and pixel signals of the non-polarization pixels that are generated in the image capturing unit to calculate at least either unpolarized components or diffuse reflection components for each pixel.

In this technique, in an image capturing unit, an imaging element has a 4×4-pixel area in which pixels including at least one pixel of every color component of a plurality of color components are polarization pixels of the same polarization direction, and pixels which are not the polarization pixels constitute the majority of the 4×4-pixel area, and are non-polarization pixels. An object to be captured is irradiated with, as illumination light, polarization light of a polarization direction orthogonal to a polarization direction of polarization pixels of the imaging element, and is captured. The image processing unit calculates the unpolarized components, and the diffuse reflection components on the basis of pixel signals of non-polarization pixels and polarization pixels for each color component that are generated at the image capturing unit, and calculates specular reflection components on the basis of the calculated unpolarized components, and diffuse reflection components for each color component, for example. The unpolarized components and diffuse reflection components are calculated through filtering using pixel signals, for example. The image processing unit performs filtering by using the pixel signals, and calculates, for each pixel, low frequency components for each color component, and calculates, for each pixel position, high frequency component information on the basis of pixel signals, and low frequency components of the same color components as color components of the pixels. Furthermore, the image processing unit calculates, for each color component, the unpolarized components, and the diffuse reflection components from the high frequency component information calculated for each pixel position, and the low frequency components for each color component. In addition, the image processing unit may perform interpolation instead of the filtering. The image processing unit performs interpolation by using pixel signals of non-polarization pixels of the same colors as colors of polarization pixels, and calculates unpolarized components of the polarization pixels, and performs interpolation by using pixel signals of polarization pixels of the same colors as colors of the non-polarization pixels, and calculates diffuse reflection components of the non-polarization pixels.

The image processing unit adjusts a component amount of at least either the calculated diffuse reflection components or specular reflection components, and combines the diffuse reflection components and the specular reflection components to thereby generate an output image signal. For example, the image processing unit lowers a component amount of the specular reflection components or performs adjustment of a component amount of only the diffuse reflection components, and combines the diffuse reflection components and the specular reflection components. In addition, the image processing unit performs object recognition by using unpolarized components or diffuse reflection components, and performs adjustment of a component amount of at least either the diffuse reflection components or the specular reflection components for each recognized object area.

In addition, at the image capturing unit, generation of a pixel signal by adding signals from pixels of the same polarization characteristic and color component is performed, and at the image processing unit, image reduction is performed corresponding to the number of the pixels for which the addition of signals has been performed, in a direction orthogonal to an array direction of the pixels for which the addition of the signals has been performed.

A second aspect of this technique lies in an imaging element having a pixel area constituted by using pixels of a plurality of color components, the pixel area being provided with a 4×4-pixel area in which pixels including at least one pixel of every color component of the plurality of color components are polarization pixels of the same polarization direction, and pixels which are not the polarization pixels constitute a majority of the 4×4-pixel area, and are non-polarization pixels.

In this technique, in a 4×4-pixel area, pixels including at least one pixel of every color component of a plurality of color components are polarization pixels of the same polarization direction, and pixels which are not the polarization pixels constitute a majority of the 4×4-pixel area, and are non-polarization pixels. For example, a 2×2-pixel area in the 4×4-pixel area is constituted by polarization pixels of the same polarization direction including a pixel of every color component. Alternatively, four 2×2-pixel areas included in the 4×4-pixel area are constituted by pixels of every color component, and one pixel in each of the 2×2-pixel areas is one of the polarization pixels. Alternatively, each 2×2-pixel area of four 2×2-pixel areas included in the 4×4-pixel area is constituted by pixels of the same color component. The 4×4-pixel area constituted by polarization pixels and non-polarization pixels in this manner is provided, for example, repetitively or repetitively at predetermined intervals in a pixel area constituted by using pixels of a plurality of color components.

A third aspect of this technique lies in an image processing method including:

acquiring pixel signals of polarization pixels, and pixel signals of non-polarization pixels from an image capturing unit having an imaging element with a 4×4-pixel area in which pixels including at least one pixel of every color component of a plurality of color components are the polarization pixels of a same polarization direction, and pixels which are not the polarization pixels constitute a majority of the 4×4-pixel area, and are the non-polarization pixels; and using the pixel signals of the polarization pixels, and the pixel signals of the non-polarization pixels that are acquired from the image capturing unit to calculate at least either unpolarized components or diffuse reflection components for each pixel.

Advantageous Effects of Invention

According to this technique, in an image capturing unit, an imaging element has a 4×4-pixel area in which pixels including at least one pixel of every color component of a plurality of color components are polarization pixels of the same polarization direction, and pixels which are not the polarization pixels constitute the majority of the 4×4-pixel area, and are non-polarization pixels. The image processing unit calculates unpolarized components, and diffuse reflection components for each pixel by using pixel signals of polarization pixels, and pixel signals of non-polarization pixels that are generated at the image capturing unit. Accordingly, non-polarization images with high resolution and sensitivity, and reflection components for each color component can be acquired. Note that the effects described in the present specification are illustrated merely as examples, but not as limitations, and there may be additional effects.

BRIEF DESCRIPTION OF DRAWINGS

FIG. 2 is a view illustrating a relation between a polarization pixel of an image capturing unit, and illumination light of an illuminating unit.

FIGS. 3A, 3B, 3C, and 3D depict views each illustrating a pixel arrangement of the image capturing unit in a first embodiment.

FIG. 4 is a view illustrating filter coefficients.

FIG. 5 is an explanatory view illustrating a low frequency component calculation operation for a non-polarization G pixel.

FIGS. 9A, 9B, 9C, and 9D depict views each illustrating a pixel arrangement of an image capturing unit in a second embodiment.

FIGS. 10A, 10B, 10C, and 10D depict views each illustrating a pixel arrangement of an image capturing unit in a third embodiment.

FIGS. 11A, 11B, 11C, and 11D depict views each illustrating a pixel arrangement of an image capturing unit in a fourth embodiment.

FIG. 15 is a table illustrating characteristics of the first to fifth embodiments, and conventional characteristics.

FIGS. 16A, 16B, 16C, and 16D depict views illustrating output images acquired in a case where coefficients α and β are set to different values.

FIGS. 19A and 19B depict views illustrating pixels, and read-out signal lines of the image capturing unit.

FIGS. 20A, 20B, 20C, and 20D depict explanatory views illustrating an operation of reading out pixel signals.

FIGS. 21A and 21B depict views illustrating a relations between the pixel arrangement of an image capturing unit 20-1, and an image that is on the basis of pixel signals to be output from the image capturing unit 20-1.

DESCRIPTION OF EMBODIMENTS

Modes for carrying out the present technique will be described below. Note that descriptions will be given in the following order.

1. Configuration of Image Capturing Device
2. First Embodiment
3. Second Embodiment
4. Third Embodiment
5. Fourth Embodiment
6. Fifth Embodiment
7. Regarding Characteristics of First to Fifth Embodiments, and Characteristics of Conventional Configuration
8. Operations of Reflection Component Adjusting Unit
9. Regarding Signal Reading in Image Capturing Unit <1. Configuration of Image Capturing Device>

Figure 1:
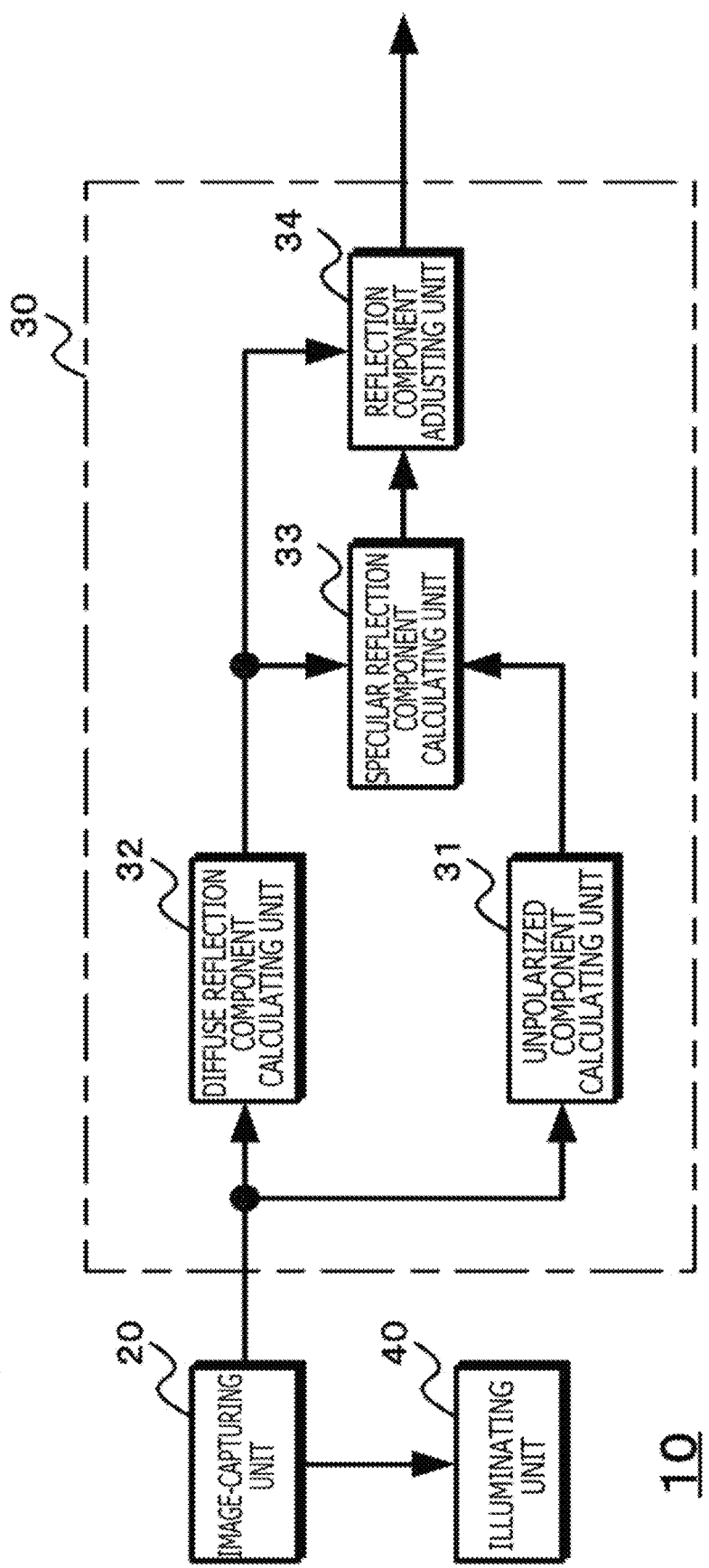
FIG. 1 is a block diagram illustrating a configuration of an image capturing device.

FIG. 1 illustrates a configuration of an image capturing device of the present technique. An image capturing device 10 has an image capturing unit 20, and an image processing unit 30. In addition, the image capturing device 10 may have an illuminating unit 40, and the illuminating unit 40 may be provided separately from the image capturing device 10. The illuminating unit 40 performs an illuminating operation in synchronization with the image capturing device 10.

An imaging element to be used in the image capturing unit 20 has a configuration including color filters and polarizers that are provided at an image capturing surface of a sensor unit such as a CMOS (Complementary Metal Oxide Semiconductor) or a CCD (Charge Coupled Device). The color filter adopts a mosaic filter, and for example, a pixel array of the imaging element is an array including R pixels (red pixels), G pixels (green pixels), and B pixels (blue pixels) in a 4×4-pixel area. The polarizers are configured such that pixels including at least one pixel of every color component of a plurality of color components are polarization pixels of the same polarization direction and pixels other than the polarization pixels constitute a majority of the 4×4-pixel area, and are non-polarization pixels. For example, the imaging element is provided such that, in a 4×4-pixel area, pixels including at least one R pixel (red pixel), at least one G pixel (green pixel), and at least one B pixel (blue pixel) are polarization pixels of the same polarization direction, and pixels other than the polarization pixels constitute a majority of the 4×4-pixel area and are non-polarization pixels of each color component. In a pixel area of the imaging element configured by using pixels of a plurality of color components, 4×4-pixel areas having the above-mentioned pixel array are provided repetitively or repetitively at predetermined intervals.

The image capturing unit 20 performs image capturing of a still image or a moving image at timing when illumination light is being emitted from the illuminating unit 40, and outputs generated pixel signals of the polarization pixels and the non-polarization pixels to the image processing unit 30. In addition, the image capturing unit 20 may perform white balance adjustment so as to allow the image processing unit 30 to calculate unpolarized components, and diffuse reflection components as mentioned below by using white-balance-adjusted pixel signals. Note that the white balance adjustment may be performed at the image processing unit 30.

The illuminating unit 40 emits polarized light as illumination light to an object. The illuminating unit 40 performs emission of the illumination light in synchronization with an image capturing operation of the image capturing unit 20 so as to allow the image capturing operation of the image capturing unit 20 to be performed at timing when the illumination light is being emitted from the illuminating unit 40 in the manner mentioned above.

Polarized light emitted from the illuminating unit 40 has a polarization direction that is set such that a specular reflection component in reflected light from the object is removed when the illumination light is emitted, and an image capturing operation is performed at the image capturing unit 20. Specifically, the polarization direction of the polarized light emitted from the illuminating unit 40 is set to be orthogonal to the polarization direction of the polarization pixels in the image capturing unit 20. FIG. 2 illustrates a relation between a polarization pixel of the image capturing unit, and the illumination light of the illuminating unit. A polarizer 22 provided on an incidence surface side of a sensor unit 21 in the image capturing unit 20 is a wire grid type polarizer, and has a vertical grid direction, for example. The illuminating unit 40 is constituted by using a light source 41, and a wire grid type polarizer 42, for example, and the polarizer 42 has a horizontal grid direction which is orthogonal to the grid direction of the polarizer 22 of the image capturing unit 20. In this case, an object OB is irradiated with linearly polarized light from the illuminating unit 40 that is polarized vertically. In addition, a horizontally polarized component of reflected light from the object OB is extracted by the polarizer 22, and enters the sensor unit 21. Accordingly, pixel signals based on the reflected light from the object OB are generated at the non-polarization pixels in the image capturing unit 20, and pixel signals based on horizontally polarized components in the reflected light from the object OB are generated at the polarization pixels in the image capturing unit 20.

The image processing unit 30 has an unpolarized component calculating unit 31, a diffuse reflection component calculating unit 32, a specular reflection component calculating unit 33, and a reflection component adjusting unit 34, for example. The unpolarized component calculating unit 31 calculates unpolarized components by using respective pixel signals of the non-polarization pixels, and the polarization pixels that are supplied from the image capturing unit 20, and outputs the unpolarized components to the specular reflection component calculating unit 33. The diffuse reflection component calculating unit 32 calculates diffuse reflection components by using respective pixel signals of the non-polarization pixels, and the polarization pixels that are supplied from the image capturing unit 20, and outputs the diffuse reflection components to the specular reflection component calculating unit 33, and the reflection component adjusting unit 34. The specular reflection component calculating unit 33 calculates specular reflection components on the basis of the unpolarized components calculated by the unpolarized component calculating unit 31, and the diffuse reflection components calculated by the diffuse reflection component calculating unit 32, and outputs the specular reflection components to the reflection component adjusting unit 34. The reflection component adjusting unit 34 generates an output image with reflection components set to a desired level, by using the diffuse reflection components calculated by the diffuse reflection component calculating unit 32, and the specular reflection components calculated by the specular reflection component calculating unit 33.

Next, an exemplary configuration of the image capturing unit, and operations of the image processing unit corresponding to the exemplary configuration of the image capturing unit will be described in detail in the following embodiments.

2. First Embodiment

FIGS. 3A, 3B, 3C, and 3D illustrate a pixel arrangement of the image capturing unit. An image capturing unit 20-1 has a configuration in which a pixel area configured by using pixels of a plurality of color components has a Bayer array of R pixels, G pixels, and B pixels. Note that, in each embodiment, a G pixel positioned to the left or right of an R pixel is also referred to as a Gr pixel, and a G pixel positioned to the left or right of a B pixel is also referred to as a Gb pixel. In addition, a 2×2-pixel area including an R pixel, a B pixel, and two G pixels (a Gr pixel, and a Gb pixel) is a color pixel array unit.

For example, FIG. 3A illustrates a configuration in which pixels in upper left 2×2-pixel areas are polarization pixels. In addition, FIG. 3B illustrates a configuration in which pixels in a middle 2×2-pixel area are polarization pixels, FIG. 3C illustrates a configuration in which pixels in a lower left 2×2-pixel area are polarization pixels, and FIG. 3D illustrates a configuration in which pixels in a rightmost end middle 2×2-pixel area are polarization pixels. Note that it is sufficient as long as the configuration of the image capturing unit 20-1 is a configuration in which pixels in one 2×2-pixel area in a 4×4-pixel area are polarization pixels, and the other pixels are non-polarization pixels, and is not limited to the configurations illustrated in FIGS. 3A, 3B, 3C, and 3D. In the image capturing unit 20-1, the 4×4-pixel area thus configured is provided repetitively.

The image capturing unit 20-1 performs white balance adjustment on pixel signals Rs, Gs, and Bs generated by a sensor unit. Specifically, calculations of Formulae (1) to (3) are performed by using preset white balance adjustment gains Rwg, Gwg, and Bwg for each color to generate white-balance-adjusted pixel signals R, G, and B, and output the pixel signals R, G, and B to the image processing unit 30. Note that the pixel signals Rs and R are pixel signals of R pixels, the pixel signals Gs and G are pixel signals of G pixels, and the pixel signals Bs and B are pixel signals of B pixels.

$$R = Rs \times Rwg \quad (1)$$

$$G = Gs \times Gwg \quad (2)$$

$$B = Bs \times Bwg \quad (3)$$

The unpolarized component calculating unit 31 of the image processing unit 30 calculates unpolarized components for each color by using the white-balance-adjusted pixel signals R, G, and B. On the assumption that each color component in each pixel has the same ratio of low frequency components and high frequency components to each other, the unpolarized component calculating unit 31 calculates high frequency component information corresponding to a relation between the low frequency components, and high frequency components from a pixel value of a calculation target pixel of an unpolarized component, and a low frequency component of the same color component, and the same polarization characteristic in the calculation target pixel. Furthermore, the unpolarized component calculating unit 31 calculates unpolarized components for each color component in the calculation target pixel on the basis of the calculated high frequency component information, and an unpolarized low frequency component at the calculation target pixel.

The unpolarized component calculating unit 31 performs filtering by using the pixel signals R, G, and B, and calculates, for each pixel, low frequency components for each color component by using pixel signals of the non-polarization pixels. In addition, the unpolarized component calculating unit 31 calculates, for each pixel, high frequency component information on the basis of pixel signals, and low frequency components of the same color components as color components of the pixels, and calculates, for each color component, unpolarized components from the high frequency component information calculated for each pixel, and low frequency components for each color component. The unpolarized component calculating unit 31 uses a high frequency component coefficient as the high frequency component information. The high frequency component coefficient is a coefficient corresponding to a relation between low frequency components and high frequency components included in a calculation target pixel, and for example, is a pixel value of a calculation target pixel divided by a low frequency component of a color component of the calculation target pixel. Accordingly, the smaller the low frequency component in the calculation target pixel is, the larger the value of the high frequency component coefficient is, and the larger the low frequency component in the calculation target pixel is, the smaller the value of the high frequency component coefficient is. In addition, a pixel value of a calculation target pixel including a low frequency component and a high frequency component can be calculated by multiplying the low frequency component with the high frequency component coefficient.

The unpolarized component calculating unit 31 performs weighted filtering for a calculation target pixel, and calculates a low frequency component. FIG. 4 illustrates filter coefficients, and represents a case where filtering is performed by using pixel signals in a pixel range (filter calculation range) of 9×9 pixels including a calculation target pixel at its center.

In a case where the calculation target pixel is an R pixel, the unpolarized component calculating unit 31 performs weighted filtering by using pixel signals of non-polarization R pixels. In addition, in a case where the calculation target pixel is a B pixel, the unpolarized component calculating unit 31 performs weighted filtering by using pixel signals of non-polarization B pixels, and in a case where the calculation target pixel is a G pixel, the unpolarized component calculating unit 31 performs weighted filtering by using pixel signals of non-polarization G pixels.

FIG. 5 is an explanatory view illustrating a low frequency component calculation operation for a non-polarization G pixel. Note that, in FIG. 5, the calculation target pixel is indicated in a double-line frame, and pixels used in calculation of a low frequency component are indicated in bold line frames. The unpolarized component calculating unit 31 performs weighted filtering by using pixel signals of non-polarization G pixels in a range of "x=−4, y=−4" to "x=4, y=4" (filter calculation range) relative to the calculation target pixel as the reference point (x=0, y=0). Specifically, the unpolarized component calculating unit 31 performs weighting corresponding to pixel positions on pixel values of non-polarization G pixels in the filter calculation range, and calculates the total sum of the weighted pixel values. Furthermore, the unpolarized component calculating unit 31 divides the total sum of the weighted pixel values by the total sum of weights used in the weighting to calculate a green low frequency component GLPF of the calculation target pixel. Formula (4) illustrates a formula for calculating the low frequency component GLPF in the case illustrated in FIG. 5. Note that GV(x, y) indicates a pixel value of a G pixel at a pixel position (x, y) relative to the calculation target pixel as the reference point.

$$GLPF=(1{\times}GV(-4,-4)+14{\times}GV(0,-4)+1{\times}GV(4,-4)+16{\times}GV(-3,-3)+48{\times}GV(-1,-3)+\ldots+1{\times}GV(4,4))/(1+4+1+15+48+\ldots+1) \quad (4)$$

Next, the unpolarized component calculating unit 31 divides the pixel value of the calculation target pixel by a low frequency component of the same polarization component and the same color component to calculate a high frequency component coefficient at the pixel position of the calculation target pixel. For example, in a case where the calculation target pixel is a G pixel, and has a pixel value GV(0, 0), calculation is performed according to Formula (5), and a high frequency component coefficient HPF is calculated.

$$HPF=GV(0,0)/GLPF \quad (5)$$

Thereafter, the unpolarized component calculating unit 31 multiplies the low frequency component with the high frequency component coefficient as illustrated by Formula (6) to obtain a green unpolarized component Gnp at the calculation target pixel.

$$Gnp=HPF{\times}GLPF \quad (6)$$

In a case where a red unpolarized component at the calculation target pixel is calculated, the unpolarized component calculating unit 31 performs weighting corresponding to pixel positions on pixel values of non-polarization R pixels in the filter calculation range, and calculates the total sum of the weighted pixel values. Furthermore, the unpolarized component calculating unit 31 divides the total sum of the weighted pixel values by the total sum of weights used in the weighting to calculate a low frequency component RLPF. The unpolarized component calculating unit 31 multiplies the calculated low frequency component RLPF with the previously calculated high frequency component coefficient HPF as illustrated by Formula (7) to obtain a red unpolarized component Rnp at the calculation target pixel.

$$Rnp=HPF{\times}RLPF \quad (7)$$

In a case where a blue unpolarized component at the calculation target pixel is calculated, the unpolarized component calculating unit 31 performs weighting corresponding to pixel positions on pixel values of non-polarization B pixels in the filter calculation range, and calculates the total sum of the weighted pixel values. Furthermore, the unpolarized component calculating unit 31 divides the total sum of the weighted pixel values by the total sum of weights used in the weighting to calculate a low frequency component BLPF. The unpolarized component calculating unit 31 multiplies the calculated low frequency component BLPF with the previously calculated high frequency component coefficient HPF as illustrated by Formula (8) to obtain a blue unpolarized component Bnp at the calculation target pixel.

$$Bnp=HPF{\times}BLPF \quad (8)$$

Note that although, in FIG. 5, a pixel value of a G pixel is used to calculate the high frequency component coefficient HPF, the unpolarized component calculating unit 31 uses a low frequency component of the same color component as a pixel value of an R pixel to calculate the high frequency component coefficient HPF in case where the calculation target pixel is an R pixel. In addition, the unpolarized component calculating unit 31 uses a low frequency component of the same color component as a pixel value of a B pixel to calculate the high frequency component coefficient HPF in case where the calculation target pixel is a B pixel.

The unpolarized component calculating unit 31 performs the above-mentioned process for each pixel position of the non-polarization pixels, and calculates unpolarized components for each color component for each pixel of the non-polarization pixels.

In a case where the calculation target pixel is a polarization pixel, the unpolarized component calculating unit 31 calculates a low frequency component in the manner mentioned above. That is, the unpolarized component calculating unit 31 performs weighting corresponding to pixel positions on pixel values of non-polarization R pixels (G pixels, and B pixels) in the filter calculation range, and calculates the total sum of the weighted pixel values. Furthermore, the unpolarized component calculating unit 31 divides the total sum of the weighted pixel values by the total sum of weights used in the weighting to calculate a low frequency component RLPF (GLPF, and BLPF).

In addition, the unpolarized component calculating unit 31 performs weighted filtering by using pixel signals of polarization pixels of the same color as the color of the calculation target pixel, calculates a low frequency component, divides a pixel value of the calculation target pixel by the low frequency component, and calculates the high frequency component coefficient HPF. For example, in a case where the polarization pixel (G pixel) indicated by a broken-line frame in FIG. 5 is a calculation target pixel, the unpolarized component calculating unit 31 performs weighting corresponding to pixel positions on pixel values of polarization G pixels in a filter calculation range relative to the calculation target pixel as the reference point, and calculates the total sum of the weighted pixel values. Furthermore, the unpolarized component calculating unit 31 divides the total sum of the weighted pixel values by the total sum of weights used in the weighting to calculate a low frequency component GLPFp. Next, the unpolarized component calculating unit 31 divides a pixel value of the calculation target pixel by a low frequency component of the same polarization component and the same color component to calculate a high frequency component coefficient at the pixel position of the calculation target pixel. That is, in case where the calculation target polarization pixel has a pixel value G(0, 0)p, calculation is performed according to Formula (9), and a high frequency component coefficient HPF is calculated.

$$HPF=GV(0,0)p/GLPFp \qquad (9)$$

By using the calculated high frequency component coefficients HPF, and the low frequency components RLPF (GLPF, and BLPF) for each color component calculated by using the non-polarization pixels for the calculation target pixel, the unpolarized component calculating unit 31 performs calculation according to Formulae (6) to (8), and calculates unpolarized components for each color component for each pixel of polarization pixels.

Figure 6:
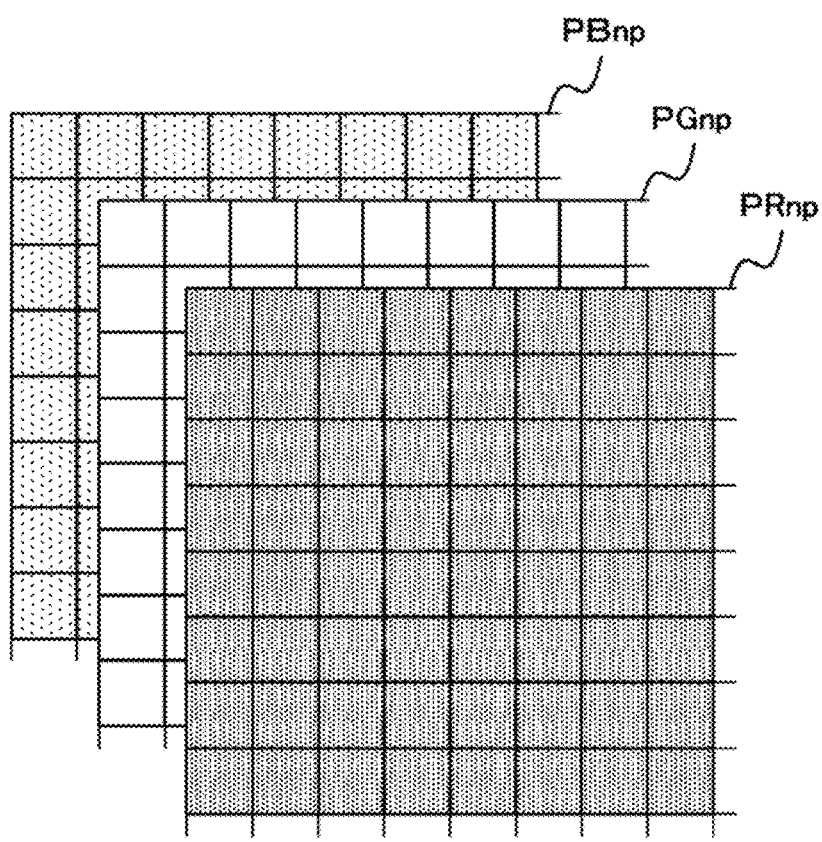
FIG. 6 is a view illustrating non-polarization images for each color component.

The unpolarized component calculating unit 31 outputs, to the specular reflection component calculating unit 33, image signals of non-polarization images PRnp, PGnp, and PBnp for each color component in FIG. 6 representing unpolarized components calculated at each pixel.

The diffuse reflection component calculating unit 32 generates diffuse reflection component signals for each color by using white-balance-adjusted pixel signals R, G, and B. On the assumption that each color component in each pixel has the same ratio of low frequency components and high frequency components to each other, the diffuse reflection component calculating unit 32 calculates high frequency component information corresponding to a relation between the low frequency components, and high frequency components from a pixel value of a calculation target pixel of a polarized diffuse component, and a low frequency component of the same color component, and the same polarization characteristic in the calculation target pixel. Furthermore, the diffuse reflection component calculating unit 32 calculates diffuse reflection polarized components for each color component in the calculation target pixel on the basis of the calculated high frequency component information, and the low frequency component of polarization in the calculation target pixel.

The diffuse reflection component calculating unit 32 performs filtering by using the pixel signals R, G, and B, and calculates low frequency components for each color component for each pixel by using pixel signals of polarization pixels. In addition, the diffuse reflection component calculating unit 32 calculates, for each pixel, high frequency component information on the basis of pixel signals, and low frequency components of the same color components as color components of the pixels, and calculates, for each color component, diffuse reflection components from the high frequency component information calculated for each pixel, and low frequency components for each color component. Furthermore, the diffuse reflection component calculating unit 32 performs correction for the effect of dimming caused by polarizers on the calculated diffuse reflection components.

The diffuse reflection component calculating unit 32 performs weighted filtering for a calculation target pixel, and calculates a low frequency component. Note that, for example, filter coefficients adopt filter coefficients which are the same as those used by the unpolarized component calculating unit 31 such that diffuse reflection component images can be generated with characteristics which are the same as those for generation of unpolarized component images.

In a case where the calculation target pixel is an R pixel, the diffuse reflection component calculating unit 32 performs weighted filtering by using pixel signals of polarization R pixels. In addition, in a case where the calculation target pixel is a B pixel, the diffuse reflection component calculating unit 32 performs weighted filtering by using pixel signals of polarization B pixels, and in a case where the calculation target pixel is a G pixel, the diffuse reflection component calculating unit 32 performs weighted filtering by using pixel signals of polarization G pixels.

For example, in a case where weighted filtering for a G pixel is performed, the diffuse reflection component calculating unit 32 performs weighting corresponding to pixel positions on pixel values of polarization G pixels in the filter calculation range, and calculates the total sum of the weighted pixel values. Furthermore, the diffuse reflection component calculating unit 32 divides the total sum of the weighted pixel values by the total sum of weights used in the weighting to calculate a low frequency component GLPFp.

Next, the diffuse reflection component calculating unit 32 divides a pixel value of the calculation target pixel by a low frequency component of the same polarization component and the same color component to calculate a high frequency component coefficient at the pixel position of the calculation target pixel. Here, in a case where the calculation target pixel has a pixel value GV (0, 0)p, calculation is performed according to Formula (10), and a high frequency component coefficient HPFp is calculated.

$$HPFp=GV(0,0)p/GLPFp \qquad (10)$$

Thereafter, the diffuse reflection component calculating unit 32 multiplies the low frequency component with the high frequency component coefficient as illustrated by Formula (11) to obtain a green diffuse component Gp at the calculation target pixel.

$$Gp=HPFp \times GLPFp \qquad (11)$$

In a case where a diffuse reflection component after passing through an R pixel polarizer at the position of the calculation target pixel is calculated, the diffuse reflection component calculating unit 32 performs weighting corresponding to pixel positions on pixel values of polarization R pixels in the filter calculation range, and calculates the total sum of the weighted pixel values. Furthermore, the diffuse reflection component calculating unit 32 divides the total sum of the weighted pixel values by the total sum of weights used in the weighting to calculate a low frequency component RLPFp. The diffuse reflection component calculating unit 32 multiplies the calculated low frequency component RLPFp with the previously calculated high frequency component coefficient HPF as illustrated by Formula (12) to obtain a red diffuse reflection component Rp of an R pixel at the position of the calculation target pixel.

$$Rp=HPFp \times RLPFp \qquad (12)$$

In a case where a diffuse reflection component after passing through a B pixel polarizer at the position of the calculation target pixel is calculated, the diffuse reflection component calculating unit 32 performs weighting corresponding to pixel positions on pixel values of polarization B pixels in the filter calculation image, and calculates the total sum of the weighted pixel values. Furthermore, the diffuse reflection component calculating unit 32 divides the total sum of the weighted pixel values by the total sum of weights used in the weighting to calculate a low frequency component BLPFp. The diffuse reflection component calculating unit 32 multiplies the calculated low frequency component BLPFp with the previously calculated high frequency component coefficient HPF as illustrated by Formula (13) to obtain a blue diffuse reflection component Bp of a B pixel at the position of the calculation target pixel.

$$Bp = HPFp \times BLPFp \quad (13)$$

Note that, in a case where a polarization pixel at the position of the calculation target pixel is an R pixel, the diffuse reflection component calculating unit 32 calculates the high frequency component coefficient HPFp by using a pixel value of the polarization R pixel. In addition, in a case where a polarization pixel at the position of the calculation target pixel is a B pixel, the diffuse reflection component calculating unit 32 calculates the high frequency component coefficient HPFp by using a pixel value of the polarization B pixel.

The diffuse reflection component calculating unit 32 performs the above-mentioned process for each pixel position of polarization pixels, and calculates, for each color component, diffuse reflection signal components for each pixel position of the polarization pixels.

In a case where the position of the calculation target pixel is the position of a non-polarization pixel, the diffuse reflection component calculating unit 32 calculates a low frequency component in the manner mentioned above. That is, the diffuse reflection component calculating unit 32 performs weighting corresponding to pixel positions on pixel values of polarization R pixels (G pixels, and B pixels) in the filter calculation range, and calculates the total sum of the weighted pixel values. Furthermore, the diffuse reflection component calculating unit 32 divides the total sum of the weighted pixel values by the total sum of weights used in the weighting to calculate a low frequency component RLPFp (GLPFp, and BLPFp).

In addition, the diffuse reflection component calculating unit 32 calculates a low frequency component of the calculation target pixel by performing filtering by using pixel signals of non-polarization pixels of the same color component as the color component of the calculation target pixel, divides a pixel value of the calculation target pixel by the calculated low frequency component, and calculates the high frequency component coefficient HPFp. For example, in a case where the calculation target pixel is a non-polarization G pixel, the diffuse reflection component calculating unit 32 performs weighting corresponding to pixel positions on pixel values of non-polarization G pixels in a filter calculation range relative to the calculation target pixel as the reference point, and calculates the total sum of the weighted pixel values. Furthermore, the diffuse reflection component calculating unit 32 divides the total sum of the weighted pixel values by the total sum of weights used in the weighting to calculate a low frequency component GLPF. Next, the diffuse reflection component calculating unit 32 divides a pixel value of the calculation target pixel by a low frequency component of the same polarization component and the same color component to calculate a high frequency component coefficient at the pixel position of the calculation target pixel. That is, in a case where the calculation target pixel is a non-polarization pixel, and has a pixel value GV(0, 0), calculation is performed according to Formula (14), and a high frequency component coefficient HPFp is calculated.

$$HPFp = GV(0,0)/GLPF \quad (14)$$

By using the calculated high frequency component coefficients HPFp, and the low frequency components RLPFp (GLPFp, and BLPFp) calculated by using the polarization pixels for the calculation target pixel, the diffuse reflection component calculating unit 32 performs calculation according to Formulae (11) to (13), and calculates, for each color component, diffuse reflection components for each pixel of non-polarization pixels.

Furthermore, the diffuse reflection component calculating unit 32 performs calculation according to Formula (15) by using the transmittance r of a polarizer, and performs correction for the effect of dimming due to the polarizer to calculate a diffuse reflection component of each pixel. Note that "Ip" indicates diffuse reflection components Rq, Gq, and Bq before the correction for the effect of dimming due to the polarizer, and "Idif" indicates diffuse reflection components Rdif, Gdif, and Bdif for each color component, for which the effect of dimming due to the polarizer is corrected.

$$Idif = (2/r) \times Ip \quad (15)$$

Figure 7:
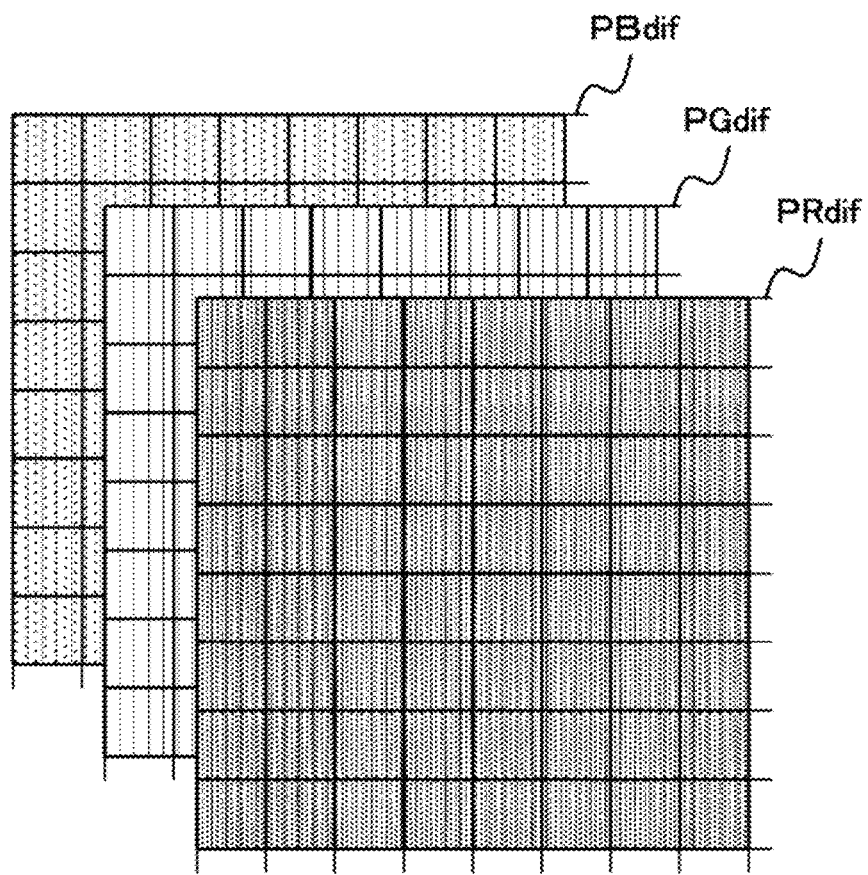
FIG. 7 is a view illustrating polarization images for each color component.

The diffuse reflection component calculating unit 32 outputs, to the specular reflection component calculating unit 33, image signals of diffuse reflection component images PRdif, PGdif, and PBdif for each color component in FIG. 7 representing diffuse reflection components calculated at each pixel.

As illustrated by Formula (16), the specular reflection component calculating unit 33 subtracts, for each color component and for each pixel position, diffuse reflection components from unpolarized components to calculate specular reflection components Ispe. Note that "Inp" indicates unpolarized components Rnp, Gnp, and Bnp for each color component, and "Ispe" indicates specular reflection components Rnp, Gnp, and Bnp for each color component. The specular reflection component calculating unit 33 outputs, to the reflection component adjusting unit 34, an image signal of a specular reflection component image representing the specular reflection components calculated at each pixel.

$$Ispe = Inp - Idif \quad (16)$$

The reflection component adjusting unit 34 combines the diffuse reflection components calculated by the diffuse reflection component calculating unit 32, and the specular reflection components calculated by the specular reflection component calculating unit 33, and generates and outputs an image signal reflection components of which have been adjusted. Note that operations of the reflection component adjusting unit 34 are mentioned in detail below.

Figure 8:
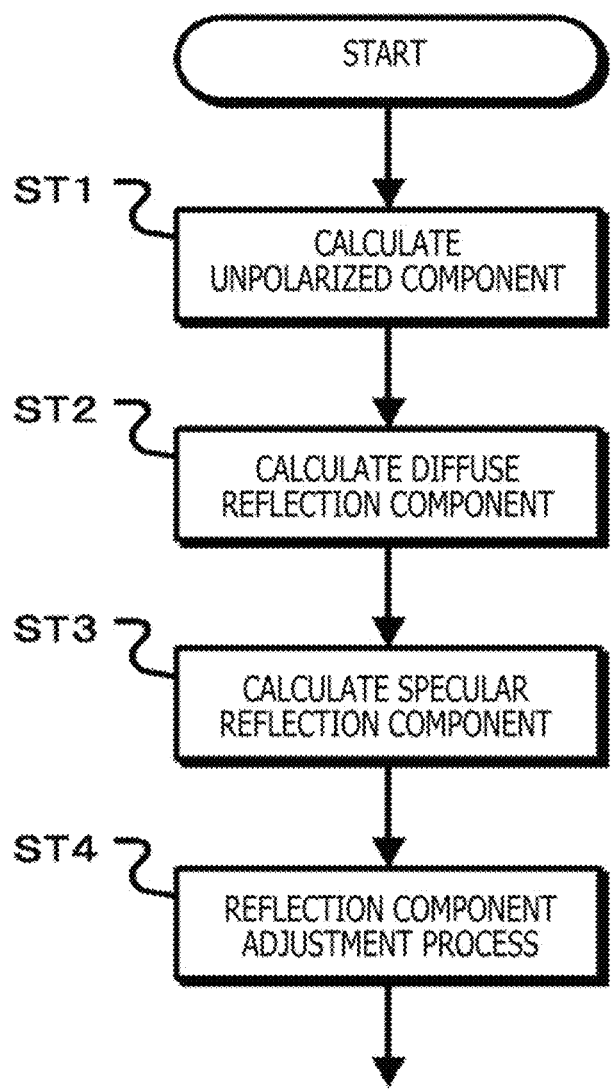
FIG. 8 is a flowchart illustrating operations of an image processing unit.

FIG. 8 is a flowchart illustrating operations of the image processing unit. At Step ST1, the image processing unit calculates unpolarized components. The image processing unit 30 performs weighted filtering by using pixel signals of non-polarization pixels, and calculates, for each pixel position, low frequency components for each color component. In addition, the image processing unit 30 divides pixel values of non-polarization pixels by the low frequency components of the same color components to calculate high frequency component coefficients for each pixel position of non-polarization pixels, and multiplies those high frequency component coefficients and the low frequency components for each color component to calculate, for each color component, unpolarized components for each pixel position of non-polarization pixels. In addition, the image processing unit 30 performs weighted filtering by using pixel values of polarization pixels, and calculates, for each polarization pixel, low frequency components of the same color components as the polarization pixels. In addition, the image processing unit 30 divides pixel values of the polarization pixels by low frequency components of the same color components to calculate high frequency component coefficients for each polarization pixel. Furthermore, the image processing unit 30 performs, for each polarization pixel, multiplication of those high frequency component coefficients, and the low frequency components for each color component at the polarization pixel positions calculated by performing weighted filtering by using pixel signals of non-polarization pixels, and calculates, for each color component, unpolarized components of the polarization pixels. In this manner, the image processing unit 30 calculates unpolarized components about polarization pixels, and non-polarization pixels for each color component, and proceeds to Step ST2.

At Step ST2, the image processing unit calculates diffuse reflection components. The image processing unit 30 performs weighted filtering by using pixel values of polarization pixels, and calculates low frequency components for each polarization pixel and for each color component. In addition, the image processing unit 30 divides pixel values of polarization pixels by the low frequency components of the same color components to calculate high frequency component coefficients for each polarization pixel, performs, for each polarization pixel, multiplication of those high frequency component coefficients and the low frequency components for each color component, and calculates, for each color component, diffuse reflection components at the polarization pixels. In addition, the image processing unit 30 performs weighted filtering by using pixel signals of non-polarization pixels, and calculates low frequency components of the same color components as the non-polarization pixels. In addition, the image processing unit 30 divides pixel values of the non-polarization pixels by low frequency components of the same color components to calculate, for each non-polarization pixel, high frequency component coefficients. Furthermore, the image processing unit 30 performs, for each non-polarization pixel, multiplication of those high frequency component coefficients, and low frequency components for each color component at the non-polarization pixel positions calculated by performing weighted filtering by using pixel signals of polarization pixels, and calculates, for each color component, diffuse reflection components at the non-polarization pixels. In this manner, the image processing unit 30 calculates, for each color component, diffuse reflection components of polarization pixels, and non-polarization pixels, and proceeds to Step ST3.

At Step ST3, the image processing unit calculates specular reflection components. The image processing unit 30 performs, for each color component at each pixel, a process of subtracting diffuse reflection components from unpolarized components, calculates specular reflection components for each color component, and proceeds to Step ST4.

At Step ST4, the image processing unit performs a reflection component adjustment process. The image processing unit 30 performs, for each color component at each pixel, a process of adding diffuse reflection components and specular reflection components at desired ratios, and obtains an output image with the adjusted reflection components.

Note that the order operations of the image processing unit 30 are not limited to the one illustrated in FIG. 8. For example, the calculation of diffuse reflection components illustrated as Step ST2 may be performed before the calculation of unpolarized components illustrated as Step ST1. In addition, in a case where parallel processing is possible, the calculation of unpolarized components, and the calculation of diffuse reflection components may be performed in parallel.

In this manner, the image capturing unit 20-1 in the first embodiment has a configuration in which R pixels, G pixels, and B pixels are provided in a Bayer array, pixels in one 2×2-pixel area (color pixel array unit) included in a 4×4-pixel area are polarization pixels, and the other pixels are non-polarization pixels. In addition, the image processing unit 30 uses image signals generated at the image capturing unit 20-1 to calculate, for each color component, unpolarized components, diffuse reflection components, and specular reflection components. Accordingly, it becomes possible to acquire non-polarization images with high resolution and sensitivity, and reflection components for each color.

In addition, since R pixels, G pixels, and B pixels are provided in a Bayer array in the image capturing unit 20-1 in the first embodiment, it becomes possible to obtain a captured image with less moire even if an object with fine patterns is captured.

3. Second Embodiment

Next, a second embodiment will be described. The second embodiment is different from the first embodiment in terms of the pixel arrangement of the image capturing unit. FIGS. 9A, 9B, 9C, and 9D illustrate the pixel arrangements of the image capturing unit. An image capturing unit 20-2 has a configuration in which a pixel area constituted by using pixels of a plurality of color components has a Bayer array of R pixels, G pixels, and B pixels. In addition, a 2×2-pixel area including an R pixel, a B pixel, and two G pixels (a Gr pixel, and a Gb pixel) is as a color pixel array unit. The image capturing unit 20-2 has a configuration in which one R pixel, one B pixel, and two G pixels (a Gr pixel, and a Gb pixel) are included as polarization pixels in a 4×4-pixel area, with mutually different color component pixels being arranged as polarization pixels in different color pixel array units included in the 4×4-pixel area.

For example, FIG. 9A illustrates a configuration in which a Gr pixel in the upper left 2×2-pixel area is a polarization pixel, a B pixel in the upper right 2×2-pixel area is a polarization pixel, an R pixel in the lower left 2×2-pixel area is a polarization pixel, and a Gb pixel in the lower right 2×2-pixel area is a polarization pixel. In addition, FIG. 9B illustrates a configuration in which an R pixel in the upper left 2×2-pixel area is a polarization pixel, a B pixel in the upper right 2×2-pixel area is a polarization pixel, a Gb pixel in the lower left 2×2-pixel area is a polarization pixel, and a Gr pixel in the lower right 2×2-pixel area is a polarization pixel. In addition, (c) in FIG. 9C illustrates a configuration in which a Gb pixel in the upper left 2×2-pixel area is a polarization pixel, an R pixel in the upper right 2×2-pixel area is a polarization pixel, a B pixel in the lower left 2×2-pixel area is a polarization pixel, and a Gr pixel in the lower right 2×2-pixel area is a polarization pixel. Furthermore, FIG. 9D illustrates a configuration in which a B pixel in the upper left 2×2-pixel area is a polarization pixel, a Gr pixel in the upper right 2×2-pixel area is a polarization pixel, a Gb pixel in the lower left 2×2-pixel area is a polarization pixel, and an R pixel in the lower right 2×2-pixel area is a polarization pixel. In the image capturing unit 20-2, the 4×4-pixel area thus configured is provided repetitively.

As in the first embodiment, the image capturing unit 20-2 performs white balance adjustment on pixel signals Rs, Gs, and Bs generated at the sensor unit, generates white-balance-adjusted image signals R, G, and B, and outputs them to the image processing unit 30.

As in the first embodiment, the unpolarized component calculating unit 31 of the image processing unit 30 calculates unpolarized components for each color by using the white-balance-adjusted pixel signals R, G, and B. The unpolarized component calculating unit 31 performs weighted filtering by using pixel values of non-polarization pixels, and calculates low frequency components for each pixel position for each color component. In addition, the unpolarized component calculating unit 31 divides pixel values of the non-polarization pixels by low frequency components of the same color components to calculate high frequency component coefficients HPF for each pixel position of the non-polarization pixels. Furthermore, by using the calculated high frequency component coefficients, and the low frequency components calculated by using the non-polarization pixels, the unpolarized component calculating unit 31 performs calculation according to the above-mentioned Formulae (6) to (8), and calculates unpolarized components for each non-polarization pixel and for each color component.

In addition, the unpolarized component calculating unit 31 performs weighted filtering by using pixel values of polarization pixels, and calculates low frequency components of color components of polarization pixels for each pixel position of the polarization pixels. In addition, the unpolarized component calculating unit 31 divides pixel values of the polarization pixels by low frequency components of the same color components to calculate high frequency component coefficients for each polarization pixel. Furthermore, the unpolarized component calculating unit 31 performs, for each polarization pixel, multiplication of those high frequency component coefficients, and the low frequency components for each color component at the polarization pixel positions calculated by performing weighted filtering by using pixel signals of non-polarization pixels, and calculates, for each color component, unpolarized components of the polarization pixels.

The unpolarized component calculating unit 31 performs the above-mentioned process for each pixel, and calculates, for each color component, unpolarized components at each pixel of non-polarization pixels, and polarization pixels to output, to the specular reflection component calculating unit 33, image signals of non-polarization images PRnp, PGnp, and PBnp for each color component in FIG. 6 representing unpolarized components.

As in the first embodiment, the diffuse reflection component calculating unit 32 generates diffuse reflection component signals for each color by using white-balance-adjusted pixel signals R, G, and B. The diffuse reflection component calculating unit 32 performs weighted filtering by using pixel values of polarization pixels, and calculates low frequency components for polarization pixel and for each color component. In addition, the diffuse reflection component calculating unit 32 divides pixel values of the polarization pixels by low frequency components of the same color components to calculate high frequency component coefficients for polarization pixel. Furthermore, by using the calculated high frequency component coefficients, and the low frequency components calculated by using the polarization pixels, the diffuse reflection component calculating unit 32 performs calculation according to the above-mentioned Formulae (11) to (13), and calculates diffuse reflection components for each polarization pixel and for each color component. In addition, the diffuse reflection component calculating unit 32 performs weighted filtering by using pixel signals of non-polarization pixels, and calculates low frequency components of the same color components as the non-polarization pixels. In addition, the diffuse reflection component calculating unit 32 divides pixel values of the non-polarization pixels by low frequency components of the same color components to calculate, for each non-polarization pixel, high frequency component coefficients. Furthermore, the image processing unit 30 performs, for each non-polarization pixel, multiplication of those high frequency component coefficients, and the low frequency components for each color component at the non-polarization pixel positions calculated by performing weighted filtering by using pixel signals of polarization pixels, and calculates, for each color component, diffuse reflection components of the non-polarization pixels.

Furthermore, the diffuse reflection component calculating unit 32 performs correction for the effect of dimming due to a polarizer by using the transmittance r of the polarizer to calculate diffuse reflection components of each pixel.

The diffuse reflection component calculating unit 32 performs the above-mentioned process for each pixel, and calculates, for each color component, diffuse reflection components at each pixel of non-polarization pixels and polarization pixels to output, to the specular reflection component calculating unit 33, image signals of diffuse reflection component images PRdif, PGdif, and PBdif for each color component in FIG. 7 representing diffuse reflection components.

The specular reflection component calculating unit 33 subtracts, for each color component and for each pixel position, diffuse reflection components from unpolarized components to calculate specular reflection components, and outputs, to the reflection component adjusting unit 34, an image signal of a specular reflection component image representing the specular reflection components calculated at each pixel.

The reflection component adjusting unit 34 combines the diffuse reflection components calculated by the diffuse reflection component calculating unit 32, and the specular reflection components calculated by the specular reflection component calculating unit 33, and generates and outputs an image signal reflection components of which have been adjusted.

Note that operations of the image processing unit in the second embodiment are the same as those in the flowchart illustrated in FIG. 8.

In this manner, the image capturing unit 20-2 in the second embodiment has a configuration in which R pixels, G pixels, and B pixels are provided in a Bayer array, and one R pixel, and one B pixel, and two G pixels are provided as polarization pixels in a 4×4-pixel area, with mutually different pixels being arranged as polarization pixels in different color pixel array units included in the 4×4-pixel area, that is, color pixel array units of 2×2-pixel areas each including an R pixel, a B pixel, and two G pixels. In addition, the image processing unit 30 uses image signals generated at the image capturing unit 20-2 to calculate unpolarized components, diffuse reflection components, and specular reflection components for each color. Accordingly, it becomes possible to acquire non-polarization images with high resolution and sensitivity, and reflection components for each color.

In addition, the image capturing unit 20-2 in the second embodiment is provided with R pixels, G pixels, and B pixels in a Bayer array. Accordingly, it becomes possible to obtain a captured image with less moire even if an object with fine patterns is captured. Furthermore, since the distances between polarization pixels are short in the second embodiment as compared with the first embodiment, the resolution of reflection components can be increased.

4. Third Embodiment

Next, a third embodiment will be described. The third embodiment is different from the first and second embodiments in the pixel arrangement of the image capturing unit. FIGS. 10A, 10B, 10C, and 10D illustrate the pixel arrangements of the image capturing unit. In the image capturing unit 20-3, a pixel area constituted by using pixels of a plurality of color components is constituted by 2×2-pixel areas as color units each including pixels of the same color component, and a color unit area of R pixels, a color unit area of B pixels, and two color unit areas of G pixels are provided in a 4×4-pixel area. In addition, the image capturing unit 20-3 has a configuration in which one R pixel, one B pixel, and two G pixels are provided adjacent to each other in a 2×2-pixel area in a 4×4-pixel area.

For example, FIG. 10A has a lower right R pixel in the upper left 2×2-pixel area as a polarization pixel, and a lower left Gr pixel in the upper right 2×2-pixel area as a polarization pixel. In addition, illustrated is the configuration in which an upper right Gb pixel in the lower left 2×2-pixel area is a polarization pixel, and an upper left B pixel in the lower right 2×2-pixel area is a polarization pixel. In addition, FIG. 10B has a lower left R pixel in the upper left 2×2-pixel area as a polarization pixel, and a lower right Gr pixel in the upper right 2×2-pixel area as a polarization pixel. In addition, illustrated is the configuration in which an upper left Gb pixel in the lower left 2×2-pixel area is a polarization pixel, and an upper right B pixel in the lower right 2×2-pixel area is a polarization pixel. In addition, FIG. 10C has an upper right R pixel in the upper left 2×2-pixel area as a polarization pixel, and an upper left Gr pixel in the upper right 2×2-pixel area as a polarization pixel. In addition, illustrated is the configuration in which a lower right Gb pixel in the lower left 2×2-pixel area is a polarization pixel, and a lower left B pixel in the lower right 2×2-pixel area is a polarization pixel. Furthermore, FIG. 10D has an upper left R pixel in the upper left 2×2-pixel area as a polarization pixel, and an upper right Gr pixel in the upper right 2×2-pixel area as a polarization pixel. In addition, illustrated is the configuration in which a lower left Gb pixel in the lower left 2×2-pixel area is a polarization pixel, and a lower right B pixel in the lower right 2×2-pixel area is a polarization pixel. In the image capturing unit 20-3, the 4×4-pixel area thus configured is provided repetitively.

As in the first and second embodiments, the image capturing unit 20-3 performs white balance adjustment on pixel signals Rs, Gs, and Bs generated at the sensor unit, generates white-balance-adjusted image signals R, G, and B, and outputs them to the image processing unit 30.

As in the first and second embodiments, the unpolarized component calculating unit 31 of the image processing unit 30 calculates unpolarized components for each color by using the white-balance-adjusted pixel signals R, G, and B. The unpolarized component calculating unit 31 performs weighted filtering by using pixel values of non-polarization pixels, and calculates low frequency components for each pixel position for each color component. In addition, the unpolarized component calculating unit 31 divides pixel values of the non-polarization pixels by low frequency components of the same color components to calculate high frequency component coefficients HPF for each pixel position of the non-polarization pixels. Furthermore, by using the calculated high frequency component coefficients, and the low frequency components calculated by using the non-polarization pixels, the unpolarized component calculating unit 31 performs calculation according to the above-mentioned Formulae (6) to (8), and calculates unpolarized components for each non-polarization pixel and for each color component.

In addition, the unpolarized component calculating unit 31 performs weighted filtering by using pixel values of polarization pixels, and calculates low frequency components of color components of polarization pixels for each pixel position of the polarization pixels. In addition, the unpolarized component calculating unit 31 divides pixel values of the polarization pixels by low frequency components of the same color components to calculate high frequency component coefficients for each polarization pixel. Furthermore, the unpolarized component calculating unit 31 performs, for each polarization pixel, multiplication of those high frequency component coefficients, and the low frequency components for each color component at the polarization pixel positions calculated by performing weighted filtering by using pixel signals of non-polarization pixels, and calculates, for each color component, unpolarized components of the polarization pixels.

The unpolarized component calculating unit 31 performs the above-mentioned process for each pixel, and calculates, for each color component, unpolarized components at each pixel of non-polarization pixels, and polarization pixels to output, to the specular reflection component calculating unit 33, image signals of non-polarization images PRnp, PGnp, and PBnp for each color component in FIG. 6 representing polarized components.

As in the first and second embodiments, the diffuse reflection component calculating unit 32 generates diffuse reflection component signals for each color by using white-balance-adjusted pixel signals R, G, and B. The diffuse reflection component calculating unit 32 performs weighted filtering by using pixel values of polarization pixels, and calculates low frequency components for each polarization pixel and for each color component. In addition, the diffuse reflection component calculating unit 32 divides pixel values of the polarization pixels by low frequency components of the same color components to calculate high frequency component coefficients for each polarization pixel. Furthermore, by using the calculated high frequency component coefficients, and the low frequency components calculated by using the polarization pixels, the diffuse reflection component calculating unit 32 performs calculation according to the above-mentioned Formulae (11) to (13), and calculates diffuse reflection components for each polarization pixel and for each color component. In addition, the diffuse reflection component calculating unit 32 performs weighted filtering by using pixel signals of non-polarization pixels, and calculates low frequency components of the same color components as the non-polarization pixels. In addition, the diffuse reflection component calculating unit 32 divides pixel values of the non-polarization pixels by low frequency components of the same color components to calculate, for each non-polarization pixel, high frequency component coefficients. Furthermore, the image processing unit 30 performs, for each non-polarization pixel, multiplication of those high frequency component coefficients, and the low frequency components for each color component at the non-polarization pixel positions calculated by performing weighted filtering by using pixel signals of polarization pixels, and calculates, for each color component, diffuse reflection components of the non-polarization pixels. Furthermore, the diffuse reflection component calculating unit 32 performs correction for the effect of dimming due to a polarizer by using the transmittance r of the polarizer to calculate diffuse reflection components of each pixel.

The diffuse reflection component calculating unit 32 performs the above-mentioned process for each pixel, and calculates, for each color component, diffuse reflection components at each pixel of non-polarization pixels and polarization pixels to output, to the specular reflection component calculating unit 33, image signals of diffuse reflection component images PRdif, PGdif, and PBdif for each color component in FIG. 7 representing diffuse reflection components.

The specular reflection component calculating unit 33 subtracts, for each color component and for each pixel position, diffuse reflection components from unpolarized components to calculate specular reflection components, and outputs, to the reflection component adjusting unit 34, an image signal of a specular reflection component image representing the specular reflection components calculated at each pixel.

The reflection component adjusting unit 34 combines the diffuse reflection components calculated by the diffuse reflection component calculating unit 32, and the specular reflection components calculated by the specular reflection component calculating unit 33, and generates and outputs an image signal reflection components of which have been adjusted.

Note that operations of the image processing unit in the third embodiment are the same as those in the flowchart illustrated in FIG. 8.

In this manner, in the image capturing unit 20-3 in the third embodiment, a 2×2-pixel area is constituted as a color unit including pixels of the same color, and areas of a color unit of R pixels, a color unit of B pixels, and two color units of G pixels are provided in a 4×4-pixel area. In addition, the image capturing unit 20-3 has a configuration in which a 2×2-pixel area including one R pixel, one B pixel, and two G pixels in a 4×4-pixel area is constituted as a polarization pixel area. In addition, the image processing unit 30 uses image signals generated at the image capturing unit 20-3 to calculate unpolarized components, diffuse reflection components, and specular reflection components for each color. Accordingly, it becomes possible to acquire non-polarization images with high resolution and sensitivity, and reflection components for each color.

In addition, since 2×2-pixel areas are constituted as color units in the third embodiment, it becomes possible to obtain captured images with less color mixing as compared with a case where R pixels, G pixels, and B pixels are provided in a Bayer array as in the first embodiment, and second embodiment.

5. Fourth Embodiment

Next, a fourth embodiment will be described. The fourth embodiment is different from the first to third embodiments in the pixel arrangement of the image capturing unit. FIGS. 11A, 11B, 11C, and 11D illustrate the pixel arrangements of the image capturing unit. In the image capturing unit 20-4, a pixel area constituted by using pixels of a plurality of color components is constituted by 2×2-pixel areas as color units each including pixels of the same color component, and a color unit area of R pixels, a color unit area of B pixels, and two color unit areas of G pixels are provided in a 4×4-pixel area. In addition, the image capturing unit 20-4 has a configuration in which one pixel is provided as a polarization pixel in each color unit area, and polarization pixels are dispersedly provided every other pixel in the horizontal direction, and vertical direction in a 4×4-pixel area.

For example, FIG. 11A has an upper right R pixel in the upper left 2×2-pixel area as a polarization pixel, and an upper right Gr pixel in the upper right 2×2-pixel area as a polarization pixel. In addition, illustrated is the configuration in which an upper right Gb pixel in the lower left 2×2-pixel area is a polarization pixel, and an upper right B pixel in the lower right 2×2-pixel area is a polarization pixel. In addition, FIG. 11B has an upper left R pixel in the upper left 2×2-pixel area as a polarization pixel, and an upper left Gr pixel in the upper right 2×2-pixel area as a polarization pixel. In addition, illustrated is the configuration in which an upper left Gb pixel in the lower left 2×2-pixel area is a polarization pixel, and an upper left B pixel in the lower right 2×2-pixel area is a polarization pixel. In addition, FIG. 11C has a lower left R pixel in the upper left 2×2-pixel area as a polarization pixel, and an upper right Gr pixel in the upper right 2×2-pixel area as a polarization pixel. In addition, illustrated is the configuration in which an upper right Gb pixel in the lower left 2×2-pixel area is a polarization pixel, and a lower left B pixel in the lower right 2×2-pixel area is a polarization pixel. Furthermore, FIG. 11D has a lower right R pixel in the upper left 2×2-pixel area as a polarization pixel, and an upper left Gr pixel in the upper right 2×2-pixel area as a polarization pixel. In addition, in the configuration illustrated, a lower left Gb pixel in the lower left 2×2-pixel area is a polarization pixel, and an upper right B pixel in the lower right 2×2-pixel area is a polarization pixel. In the image capturing unit 20-4, the thus-configured 4×4-pixel area is provided repetitively.

As in the first to third embodiments, the image capturing unit 20-4 performs white balance adjustment on pixel signals Rs, Gs, and Bs generated at the sensor unit, generates white-balance-adjusted image signals R, G, and B, and outputs them to the image processing unit 30.

As in the first to third embodiments, the unpolarized component calculating unit 31 of the image processing unit 30 calculates unpolarized components for each color by using the white-balance-adjusted pixel signals R, G, and B. The unpolarized component calculating unit 31 performs weighted filtering by using pixel values of non-polarization pixels, and calculates low frequency components for each pixel position for each color component. In addition, the unpolarized component calculating unit 31 divides pixel values of the non-polarization pixels by low frequency components of the same color components to calculate high frequency component coefficients HPF for each pixel position of the non-polarization pixels. Furthermore, by using the calculated high frequency component coefficients, and the low frequency components calculated by using the non-polarization pixels, the unpolarized component calculating unit 31 performs calculation according to the above-mentioned Formulae (6) to (8), and calculates unpolarized components for each non-polarization pixel and for each color component.

In addition, the unpolarized component calculating unit 31 performs weighted filtering by using pixel values of polarization pixels, and calculates low frequency components of color components for each pixel position of the polarization pixels. In addition, the unpolarized component calculating unit 31 divides pixel values of the polarization pixels by low frequency components of the same color components to calculate high frequency component coefficients for each polarization pixel. Furthermore, the unpolarized component calculating unit 31 performs, for each polarization pixel, multiplication of those high frequency component coefficients, and the low frequency components for each color component at the polarization pixel positions calculated by performing weighted filtering by using pixel signals of non-polarization pixels, and calculates, for each color component, unpolarized components of the polarization pixels.

The unpolarized component calculating unit 31 performs the above-mentioned process for each pixel, and calculates, for each color component, unpolarized components at each pixel of non-polarization pixels, and polarization pixels to output, to the specular reflection component calculating unit 33, image signals of non-polarization images PRnp, PGnp, and PBnp for each color component in FIG. 6 representing unpolarized components.

As in the first to third embodiments, the diffuse reflection component calculating unit 32 generates diffuse reflection component signals for each color by using white-balance-adjusted pixel signals R, G, and B. The diffuse reflection component calculating unit 32 performs weighted filtering by using pixel values of polarization pixels, and calculates low frequency components for each polarization pixel and for each color component. In addition, the diffuse reflection component calculating unit 32 divides pixel values of the polarization pixels by low frequency components of the same color components to calculate high frequency component coefficients for each polarization pixel. Furthermore, by using the calculated high frequency component coefficients, and the low frequency components calculated by using the polarization pixels, the diffuse reflection component calculating unit 32 performs calculation according to the above-mentioned Formulae (11) to (13), and calculates diffuse reflection components for each polarization pixel and for each color component. In addition, the diffuse reflection component calculating unit 32 performs weighted filtering by using pixel signals of non-polarization pixels, and calculates low frequency components of the same color components as the non-polarization pixels. In addition, the diffuse reflection component calculating unit 32 divides pixel values of the non-polarization pixels by low frequency components of the same color components to calculate high frequency component coefficients for each non-polarization pixel. Furthermore, the image processing unit 30 performs, for each non-polarization pixel, multiplication of those high frequency component coefficients, and the low frequency components for each color component at the non-polarization pixel positions calculated by performing weighted filtering by using pixel signals of polarization pixels, and calculates, for each color component, diffuse reflection components of the non-polarization pixels. Furthermore, the diffuse reflection component calculating unit 32 performs correction for the effect of dimming due to a polarizer by using the transmittance r of the polarizer to calculate diffuse reflection components of each pixel.

The diffuse reflection component calculating unit 32 performs the above-mentioned process for each pixel, and calculates, for each color component, diffuse reflection components at each pixel of non-polarization pixels and polarization pixels to output, to the specular reflection component calculating unit 33, image signals of diffuse reflection component images PRdif, PGdif, and PBdif for each color component in FIG. 7 representing diffuse reflection components.

The specular reflection component calculating unit 33 subtracts, for each color component and for each pixel position, diffuse reflection components from unpolarized components to calculate specular reflection components, and outputs, to the reflection component adjusting unit 34, an image signal of a specular reflection component image representing the specular reflection components calculated at each pixel.

The reflection component adjusting unit 34 combines the diffuse reflection components calculated by the diffuse reflection component calculating unit 32, and the specular reflection components calculated by the specular reflection component calculating unit 33, and generates and outputs an image signal reflection components of which has been adjusted.

Note that operations of the image processing unit in the fourth embodiment are the same as those in the flowchart illustrated in FIG. 8.

In this manner, in the image capturing unit 20-4 in the fourth embodiment, a 2×2-pixel area is constituted as a color unit including pixels of the same color, and areas of a color unit of R pixels, a color unit of B pixels, and two color units of G pixels are provided in a 4×4-pixel area. In addition, the image capturing unit 20-4 has a configuration in which one pixel is provided as a polarization pixel in each color unit area in a 4×4-pixel area, and polarization pixels are provided every other pixel in the horizontal direction, and vertical direction in the 4×4-pixel area. Accordingly, it becomes possible to acquire non-polarization images with high resolution and sensitivity, and reflection components for each color.

In addition, since 2×2-pixel areas are constituted as color units in the fourth embodiment, it becomes possible to obtain captured images with less color mixing as compared with a case where R pixels, G pixels, and B pixels are provided in a Bayer array as in the first embodiment, and second embodiment. In addition, since the distances between polarization pixels are short in the fourth embodiment as compared with the third embodiment, the resolution of reflection components can be increased.

6. Fifth Embodiment

Figure 12A:
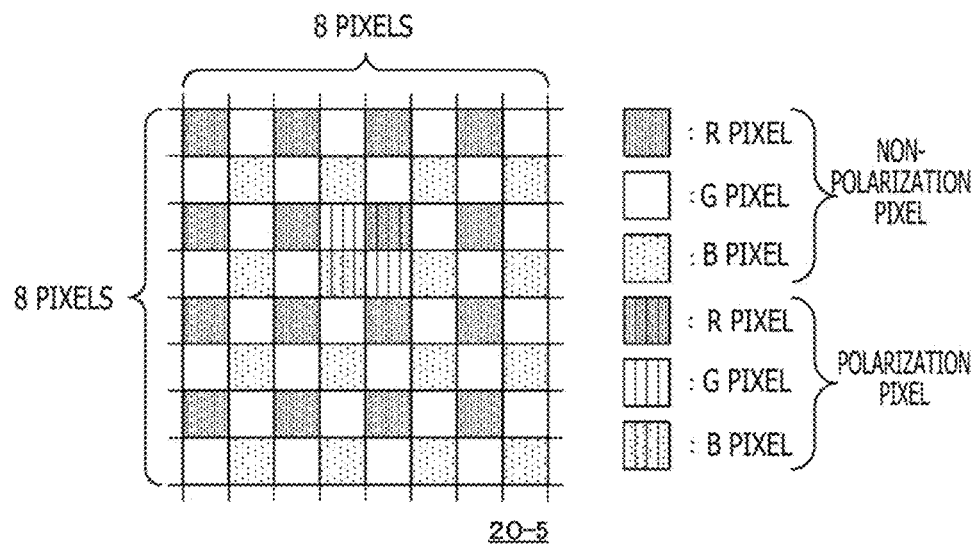
FIGS. 12A and 12B depict views each illustrating a pixel arrangement of an image capturing unit in a fifth embodiment.
Figure 12B:
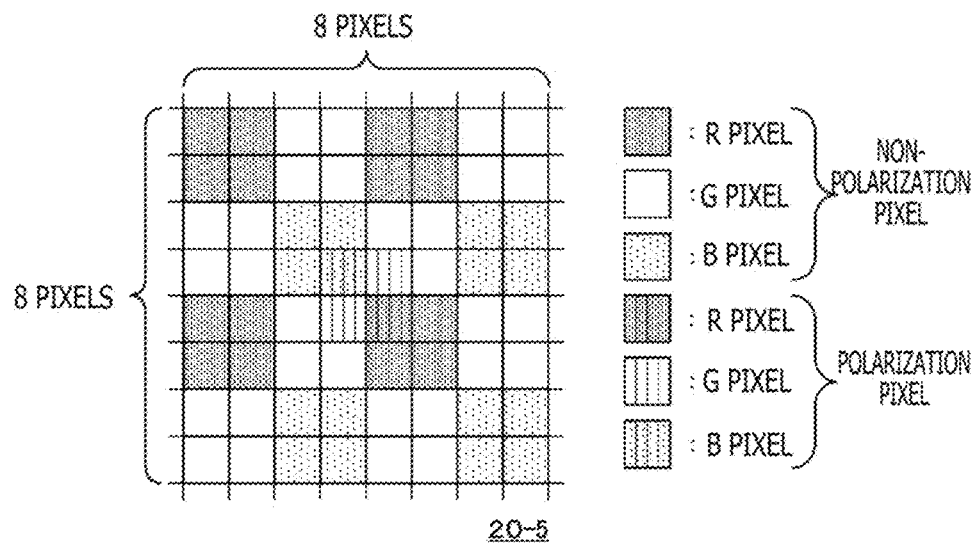

Next, a fifth embodiment will be described. The fifth embodiment is different from the first to fourth embodiments in the pixel arrangement of the image capturing unit. Although the first to fourth embodiments represent cases where 4×4-pixel areas each having polarization pixels of the same polarization direction including at least one pixel of every color component of a plurality of color components are provided repetitively, the fifth embodiment represents a case where 4×4-pixel areas each having polarization pixels of the same polarization direction including at least one pixel of every color component of a plurality of color components are provided repetitively at predetermined intervals. FIGS. 12A and 12B illustrate the pixel arrangements of the image capturing unit, and 4×4-pixel areas each having polarization pixels of the same polarization direction including at least one pixel of every color component of a plurality of color components are provided at intervals of four-pixel areas. That is, polarization pixels of the same polarization direction including at least one pixel of every color component of a plurality of color components are provided in a 4×4-pixel area in an 8×8-pixel area, and pixels which are not the polarization pixels constitute the majority of the 4×4-pixel area, and are non-polarization pixels.

For example, FIG. 12A illustrates a Bayer pixel array in which one R pixel, one B pixel, and two G pixels (a Gr pixel, and a Gb pixel) included in one 2×2-pixel area in an 8×8-pixel area are provided as polarization pixels. In addition, FIG. 12B illustrates 2×2-pixel areas constituted as color unit areas including pixels of the same colors, and a color unit area of R pixels, a color unit area of B pixels, and two color unit areas of G pixels are provided in each 4×4-pixel area. Furthermore, an 8×8-pixel area including, in each of the upward-downward directions, and leftward-rightward direction, two 4×4-pixel areas each including every color unit area has one R pixel, one B pixel, and two G pixels (a Gr pixel, and a Gb pixel) included in the middle 2×2-pixel area which are provided as polarization pixels.

As in the first to fourth embodiments, the image capturing unit 20-5 performs white balance adjustment on pixel signals Rs, Gs, and Bs generated at the sensor unit, generates white-balance-adjusted image signals R, G, and B, and outputs them to the image processing unit 30.

The unpolarized component calculating unit 31 of the image processing unit 30 calculates, for each color component, unpolarized components by using the white-balance-adjusted pixel signals R, G, and B. As compared with the above-mentioned first to fourth embodiments, the ratio of polarization pixels to non-polarization pixels is low in the fifth embodiment. Accordingly, the unpolarized component calculating unit 31 performs interpolation by using the non-polarization pixels, and calculates unpolarized components at the pixel positions of the polarization pixels.

Figure 13:
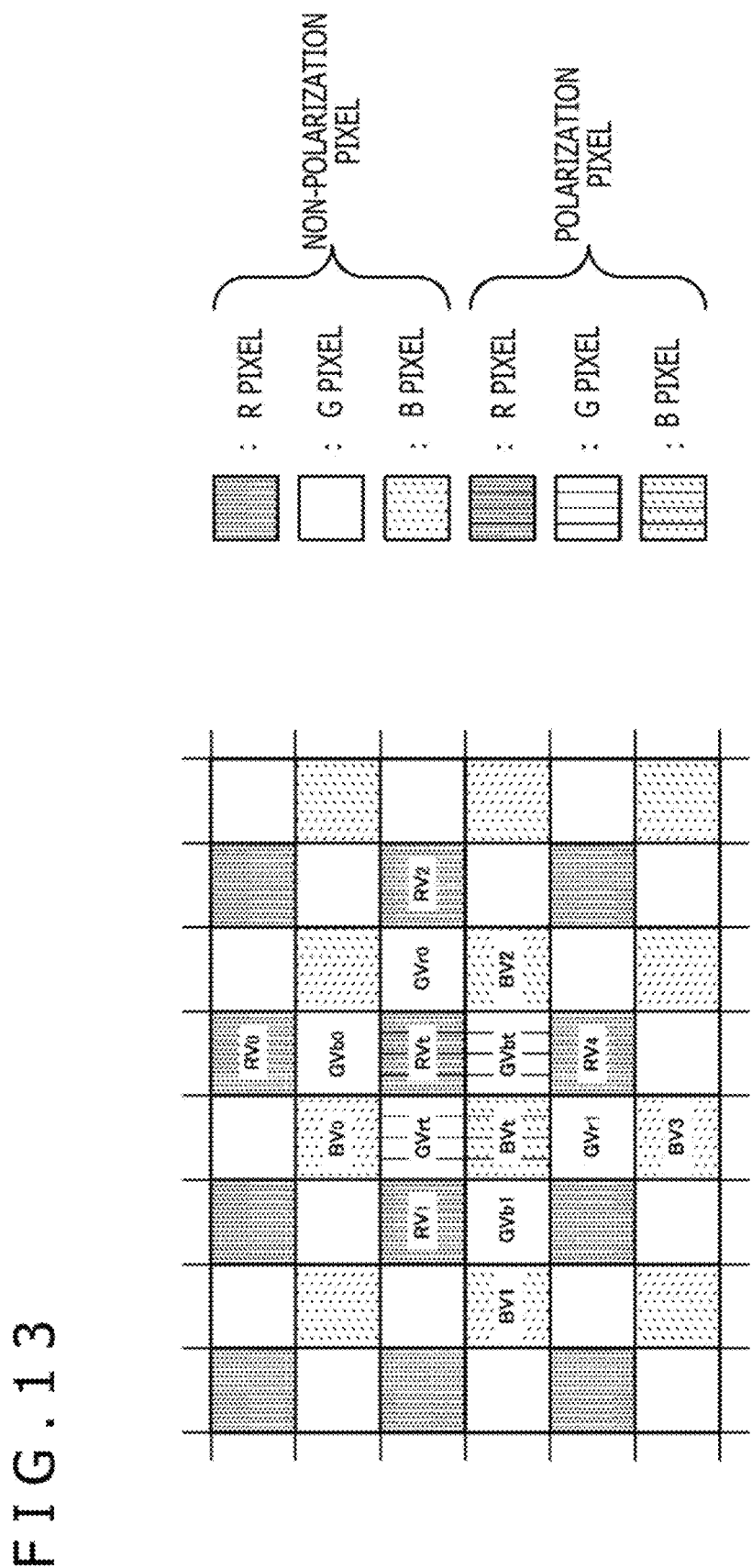
FIG. 13 is an explanatory view illustrating operations of an unpolarized component calculating unit.

FIG. 13 is an explanatory view illustrating operations of the unpolarized component calculating unit. For example, in a case where an unpolarized component RVt of a polarization R pixel is calculated, interpolation calculation illustrated by Formula (17) is performed by using pixel values RV0, RV1, RV2, and RV3 of non-polarization R pixels at positions separated by one pixel in the upward-downward directions, and leftward-rightward directions, and calculates an unpolarized component Rt. Note that pixel values of the non-polarization pixels are unpolarized components.

$$RVt=(RV0+RV1+RV2+RV3)/4 \qquad (17)$$

In addition, in a case where an unpolarized component Gbt of a polarization Gb pixel is calculated, interpolation calculation as illustrated by Formula (18) is performed by using pixel values GVr0 and GVr1 of diagonally adjacent non-polarization G pixels, and calculates an unpolarized component GVbt.

$$GVbt=(GVr0+GVr2)/2 \qquad (18)$$

In addition, in a case where an unpolarized component GVrt of a polarization Gr pixel is calculated, interpolation calculation is performed in the manner mentioned above by using pixel values GVb0 and GVb1 of diagonally adjacent non-polarization G pixels, and calculates an unpolarized component GVbt. Furthermore, in a case where an unpolarized component BVt of a polarization B pixel is calculated, interpolation calculation is performed similar to an R pixel by using pixel values BV0, BV1, BV2, and BV3 of non-polarization B pixels at positions separated by one pixel in the upward-downward directions, and leftward-rightward directions, and calculates an unpolarized component BVt.

The unpolarized component calculating unit 31 calculates an unpolarized component of a polarization pixel by performing interpolation in this manner, and generates an image signal of a Bayer array non-polarization image in which each pixel represents unpolarized components. Furthermore, the unpolarized component calculating unit 31 performs demosaicing similar to conventional techniques by using an image signal of a Bayer array non-polarization image, generates image signals of non-polarization images PRnp, PGnp, and PBnp for each color component, and outputs the image signals to the specular reflection component calculating unit 33.

Figure 14:
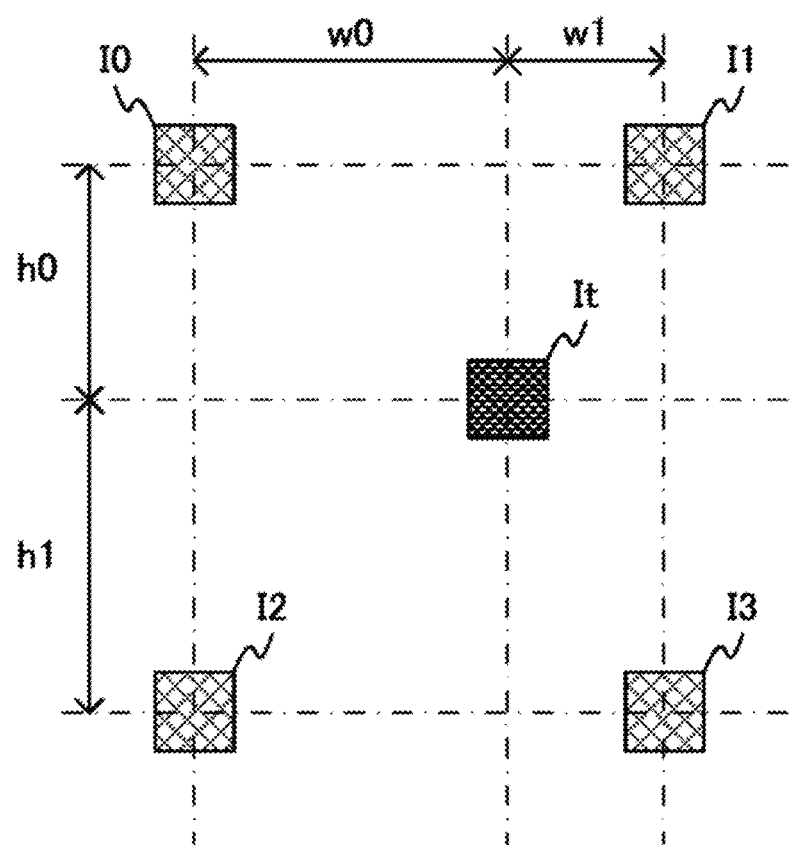
FIG. 14 is an explanatory view illustrating linear interpolation.

The diffuse reflection component calculating unit 32 calculates diffuse reflection components for each color by using white-balance-adjusted pixel signals R, G, and B. Using non-polarization pixels as calculation target pixels, the diffuse reflection component calculating unit 32 calculates diffuse reflection components of the calculation target non-polarization pixels through linear interpolation using pixel values of polarization pixels. FIG. 14 is an explanatory view illustrating linear interpolation. For example, in a case where a diffuse reflection component It of a calculation target pixel is calculated, pixel values I0, I1, I2, and I3 of, for example, four polarization pixels that are positioned around the calculation target pixel are used. For example, in a case where the calculation target pixel is an R pixel, the pixel values I0, I1, I2, and I3 used are pixel values of polarization R pixels. Note that "It" indicates any of diffuse reflection components of individual color components. In addition, "I0, I1, I2, and I3" indicate pixel values of polarization pixels of the same color component as that of "It."

The diffuse reflection component calculating unit 32 calculates a diffuse reflection component of the calculation target pixel on the basis of Formula (19). Note that, in Formula (19), "h0 and h1" indicate vertical distances between the calculation target pixel and polarization pixels which are of the same color component as the calculation target pixel and represent diffuse reflection components, and "W0 and W1" indicate horizontal distances between the calculation target pixel and polarization pixels which are of the same color component as the calculation target pixel and represent diffuse reflection components.

[Math. 1]

$$It = \frac{h_1 \frac{W_0 I_1 + w_1 I_0}{w_0 + w_1} + h_2 \frac{W_0 I_3 + w_1 I_2}{w_0 + w_1}}{h_0 + h_1} \qquad (19)$$

$$= \frac{h_1(W_0 I_1 + w_1 I_0) + h_2(W_3 I_1 + w_2 I_0)}{(h_0 + h_1)(w_0 + w_1)}$$

In addition, in a case where the calculation target pixel is a G pixel, linear interpolation using pixel values of polarization pixels which are Gr pixels, and represent diffuse reflection components as the pixel values I0, I1, I2, and I3, and linear interpolation using pixel values of polarization pixels which are Gb pixels, and represent diffuse reflection components as the pixel values I0, I1, I2, and I3 are performed, and the average value of interpolation results of the two types of linear interpolation is used as the diffuse reflection component of the calculation target G pixel.

The diffuse reflection component calculating unit 32 performs the above-mentioned linear interpolation by using each non-polarization pixel as a calculation target pixel, and calculates, as illustrated by the above-mentioned Formula (15), a diffuse reflection component of each pixel for which the effect of dimming by a polarizer is corrected, by using a diffuse reflection component of each pixel. The diffuse reflection component calculating unit 32 generates an image signal of a Bayer array diffuse reflection image in which each pixel represents a diffuse reflection component. Furthermore, the diffuse reflection component calculating unit 32 performs demosaicing similar to conventional techniques by using an image signal of a Bayer array diffuse reflection image, generates image signals of diffuse reflection images PRdif, PGdif, and PBdif for each color component, and outputs the image signals to the specular reflection component calculating unit 33.

The specular reflection component calculating unit 33 subtracts, for each color component and for each pixel position by pixel position, diffuse reflection components from unpolarized components to calculate specular reflection components, and outputs, to the reflection component adjusting unit 34, an image signal of a specular reflection component image representing the specular reflection components calculated at each pixel.

The reflection component adjusting unit 34 mixes the diffuse reflection component signals generated by the diffuse reflection component calculating unit 32, and the specular reflection component signals generated by the specular reflection component calculating unit 33, and generates and outputs an image signal reflection components of which have been adjusted.

Note that the image processing unit in the fifth embodiment performs the processes in the flowchart illustrated in FIG. 8. At Step ST1, the image processing unit performs demosaicing or the like after calculating unpolarized components of polarization pixels through interpolation using unpolarized components of non-polarization pixels of the same color components, and calculates, for each color component, unpolarized components for each pixel. In addition, at Step ST2, the image processing unit performs demosaicing, dimming correction or the like after calculating diffuse reflection components of non-polarization pixels through interpolation using diffuse reflection components of polarization pixels of the same color components, and calculates, for each color component, diffuse reflection components for each pixel.

In this manner, the image capturing unit 20-5 of the fifth embodiment has a configuration in which one R pixel, one B pixel, and two G pixels are provided as polarization pixels in an 8×8-pixel area or a larger pixel area. In addition, the 8×8-pixel area or larger pixel area has a configuration in which R pixels, G pixels, and B pixel are provided in a Bayer array, or a configuration in which color unit areas of R pixels, color unit areas of B pixels, and color unit areas of G pixels are provided as color unit areas of 2×2-pixel areas including pixels of the same colors. Accordingly, it becomes possible to acquire non-polarization images with high resolution and sensitivity and reflection components for each color component.

In addition, in the configuration of the fifth embodiment, one R pixel, one B pixel, and two G pixels are provided as polarization pixels in an 8×8-pixel area or a larger pixel area. Because of this, there are fewer polarization pixels than in the first to fourth embodiments, and it becomes possible to obtain non-polarization images with higher resolution.

7. About Characteristics of First to Fifth Embodiments, and Characteristics of Conventional Configuration FIG. 15 illustrates characteristics of the first to fifth embodiments, and conventional characteristics in a list. Note that a configuration not provided with polarization pixels, and a configuration illustrated in a prior art (the publication of Japanese Patent Laid-open No. 2013-148505) are represented as conventional examples.

All red, green, and blue reflection components cannot be acquired by not providing polarization pixels for a reason that the sensitivity lowers when polarization pixels are provided. In addition, red and blue reflection components cannot be separated in a configuration like a first embodiment in the prior application in which the sensitivity is increased, and the sensitivity is low in a configuration in which all red, green, and blue reflection components can be also separated.

For example, the sensitivity in a case where polarization pixels are not provided is assumed as being "1," and the sensitivity of pixels provided with polarizers is assumed as being ½. In this case, the sensitivity is "0.875," but red and blue reflection components cannot be obtained in the first embodiment of the prior application. In addition, all red, green, and blue reflection components can be acquired, but the sensitivity is "0.75" in a fifth embodiment of the prior application. However, according to the first to fifth embodiments in the present technique, the sensitivity is equal to or higher than "0.875," and it becomes possible to acquire all red, green, and blue reflection components.

8. Operations of Reflection Component Adjusting Unit

Next, operations of the reflection component adjusting unit in the image processing apparatus will be described. The reflection component adjusting unit 34 adjusts a component amount of at least either a diffuse reflection component Idif or a specular reflection component Ispe, and combines them. For example, the reflection component adjusting unit 34 performs a calculation according to Formula (20) by using the specular reflection component Ispe, and diffuse reflection component Idif, adjusts a component amount of at least either the specular reflection component Ispe or the diffuse reflection component Idif, and combines them to thereby generate an output image signal Iout reflection components of which has been adjusted. Note that a user may be able to freely set the coefficients α and or a plurality of combinations of the coefficients α and β may be set in advance, and a combination of the coefficients α and β may be able to be selected according to, for example, a user instruction, an object, an image capturing mode, an image capturing condition, an image capturing environment or the like.

$$Iout=\alpha \times Ispe+\beta \times Idif \qquad (20)$$

FIGS. 16A, 16B, 16C, and 16D illustrate output images acquired in a case where the coefficients α and β are set to different values. FIG. 16A represents a case where α=β=1, and the output image is a non-polarization image. FIG. 16B represents a case where α=0, and β=1, and the output image is a mat image that represents only diffuse reflection components, and has lusterless and dull colors. FIG. 16C represents a case where α=0, and β=1, and the output image is an image representing only specular reflection components. FIG. 16D represents a case where component amounts of specular reflection components are lowered and combined, for example α=0.2, and β=1. In this case, specular reflection components are slightly included in images of diffuse reflection components, reflection is reduced as compared with a non-polarization image, and the output image can be made look good.

Figures 17A, 17B:
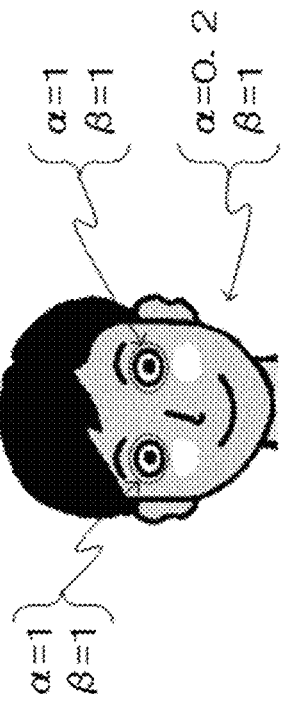
FIGS. 17A and 17B depict views illustrating output images acquired in a case where the coefficients α and p are set to different values for each object area.

In addition, the reflection component adjusting unit 34 may perform object recognition by using unpolarized components or diffuse reflection components, and perform adjustment of a component amount of at least either the diffuse reflection components or the specular reflection components for each recognized object area. FIGS. 17A and 17B depict views illustrating output images acquired in a case where the coefficients α and p are set for each object area. For example, eye areas are classified by performing object recognition, and the coefficient for areas other than the eye areas is set to "α=0.2, β=1" to acquire an image with reduced reflection as compared with non-polarization images. In addition, the coefficient for the eye areas is set to "α=1, β=1," and reflection is maintained for the eye areas. In this manner, as compared with a non-polarization image illustrated as FIG. 17A, it becomes possible to obtain an output image in which a face is never displayed as an oily face, and the shine is maintained at the portion of the eyes as illustrated in FIG. 17B. In addition, by classifying a mouth area by performing object recognition, and setting the coefficient for the mouth area to a value different from the coefficients for other regions, lips can be expressed in glossy colors, while on the other hand reflection (gleams) of the face is reduced.

Figure 18B:
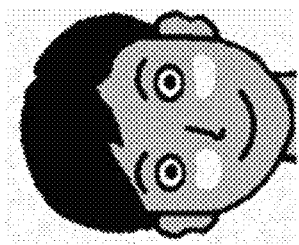
FIGS. 18A, 18B, and 18C depict views illustrating output images acquired in a case where the coefficient α is fixed to a value, and only the coefficient β is set to different values.
Figure 18C:
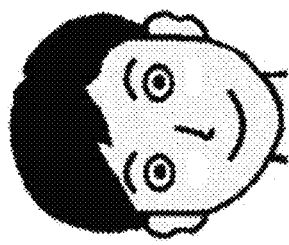
Figure 18A:
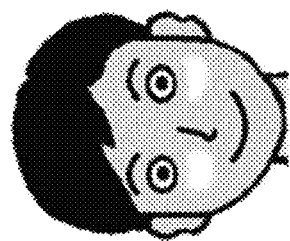

In addition, the reflection component adjusting unit 34 may perform adjustment of the component amounts of only diffuse reflection components. Specifically, the coefficient $\alpha$ related to specular reflection components is fixed, and the coefficient $\beta$ related to diffuse reflection components is changed to adjust skin colors, for example. FIGS. 18A, 18B, and 18C depict views illustrating output images acquired in a case where the coefficient $\alpha$ is fixed, and only the coefficient $\beta$ is set to different values. For example, by setting the coefficient $\beta$ to a lower value than the value for a non-polarization image illustrated in FIG. 18A, a skin color can be set to a dark color like a tanned skin as illustrated in FIG. 18B. In addition, by setting the coefficient $\beta$ to a large value, a skin color can be set to a bright color as illustrated in FIG. 18C.

9. Regarding Signal Reading in Image Capturing Unit

Meanwhile, in a case where CMOS imaging elements are used in the image capturing unit 20, pixel signals can be added together, and read out. In addition, in a case where pixel signals are added together and read out, it becomes possible to perform read-out of the pixel signals at a high frame rate, and it becomes also possible to enhance the S/N ratio of pixel signals.

Next, an operation to be performed in a case where signals from pixels are added together, and read out at the image capturing unit will be described of a case where the image capturing unit 20-1 of the first embodiment is used, for example.

FIGS. 19A and 19B illustrate pixels, and read-out signal lines of the image capturing unit. FIG. 19A illustrates part of a pixel array in the image capturing unit 20-1. In addition, FIG. 19B illustrates read-out signal lines. Pixels of the image capturing unit 20-1 have photodiodes, and transistors for electric charge transfer or resetting, although such elements are not illustrated. Each pixel discharges accumulated electric charges by driving a transistor for resetting according to a reset signal. Thereafter, each pixel drives a transistor for electric charge transfer according to a read-out signal, and outputs, to a read-out signal line, electric charges accumulated during an exposure period that starts from the end of resetting to the start of read-out as a pixel signal. The read-out signal lines are connected with analog/digital converting units (A/D), convert analog pixel signals read out from individual pixels into digital pixel signals, perform noise cancellation or the like, and then outputs the digital pixel signals to the image processing unit 30.

FIGS. 20A, 20B, 20C, and 20D depict explanatory views illustrating an operation of reading out pixel signals. The image capturing unit 20-1 sequentially adds together and reads out pixel signals from pixels of the same color components, and the same polarization characteristics among pixels in the same line connected to the same read-out signal line. For example, as illustrated in FIG. 20A, the image capturing unit 20-1 adds together and reads out pixel signals of two polarization R pixels via a read-out signal line VSL0 to generate a digital pixel signal of one polarization R pixel. In addition, the image capturing unit 20-1 adds together and reads out pixel signals of two polarization Gr pixels via a read-out signal line VSL1 to generate a digital pixel signal of one polarization Gr pixel. In addition, the image capturing unit 20-1 adds together and reads out pixel signals of two non-polarization R pixels via a read-out signal line VSL2 to generate a digital pixel signal of one non-polarization R pixel. Furthermore, the image capturing unit 20-1 adds together and reads out pixel signals of two non-polarization Gr pixels via a read-out signal line VSL3 to generate a digital pixel signal of one non-polarization Gr pixel. In this manner, pixel signals corresponding to one line are generated.

Next, the image capturing unit 20-1 generates pixel signals corresponding to the next line. For example, as illustrated in FIG. 20B, the image capturing unit 20-1 adds together and reads out pixel signals of two polarization Gr pixels via a read-out signal line VSL0 to generate a digital pixel signal of one polarization Gr pixel. In addition, the image capturing unit 20-1 adds together and reads out pixel signals of two polarization B pixels via a read-out signal line VSL1 to generate a digital pixel signal of one polarization B pixel. In addition, the image capturing unit 20-1 adds together and reads out pixel signals of two non-polarization Gb pixels via a read-out signal line VSL2 to generate a digital pixel signal of one non-polarization Gb pixel. Furthermore, the image capturing unit 20-1 adds together and reads out pixel signals of two non-polarization B pixels via a read-out signal line VSL3 to generate a digital pixel signal of one non-polarization B pixel. In this manner, pixel signals corresponding to one line are generated.

Furthermore, for example, as illustrated in FIGS. 20C and 20D, the image capturing unit 20-1 adds together and reads out pixel signals of two non-polarization pixels via the read-out signal lines VSL0 to VSL3 to generate a digital pixel signal of one non-polarization pixel. The image capturing unit 20-1 repeats processes of generating a pixel signal of one pixel by adding together two pixels of the same color and the same polarization characteristic illustrated in FIGS. 20A, 20B, 20C, and 20D to generate image signals. In this manner, the image capturing unit 20-1 moves pixels which become targets of signal addition sequentially in the vertical direction to generate pixel signals line by line.

FIGS. 21A and 21B illustrate a relationship between the pixel arrangement of the image capturing unit 20-1, and an image that is obtained on the basis of pixel signals output from the image capturing unit 20-1. When the process illustrated in FIGS. 20A, 20B, 20C, and 20D are performed on the pixel arrangement of the image capturing unit 20-1 illustrated in FIG. 21A, an image obtained on the basis of pixel signals output from the image capturing unit 20-1 has a resolution which is ½ in the vertical direction as illustrated in FIG. 21B. In view of this, in the image processing unit 30, a process may be performed such that an aspect ratio of an output image does not change, by making the horizontal resolution ½.

Figure 22:
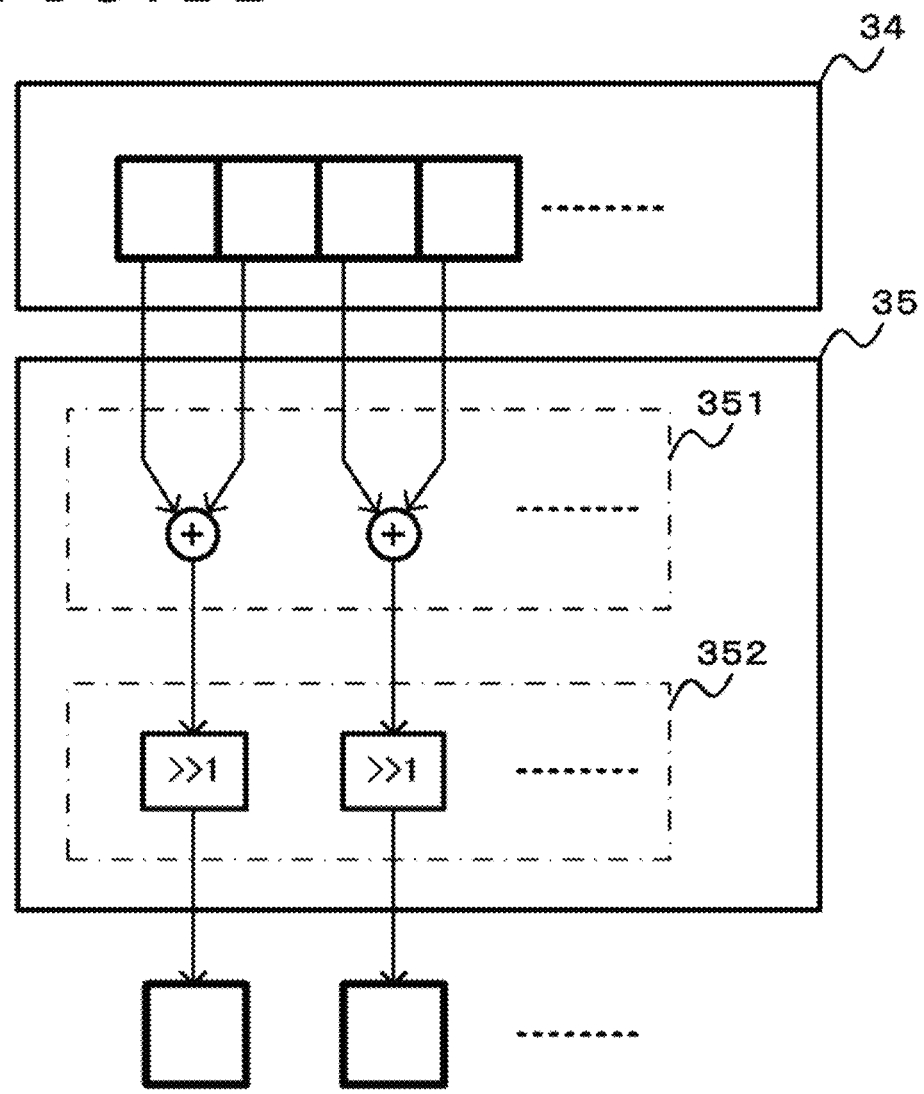
FIG. 22 is a view illustrating a configuration of a resolution converting unit.

FIG. 22 illustrates the configuration of the resolution converting unit that makes the horizontal resolution ½. The resolution converting unit 35 has an adding unit 351, and a dividing unit 352. The resolution converting unit 35 performs resolution conversion by using image signals output from the reflection component adjusting unit 34, for example.

The adding unit 351 of the resolution converting unit 35 adds together pixel values of two horizontally adjacent pixels, and outputs a result of the addition to the dividing unit 352. The dividing unit 352 performs a process of shifting rightward by one bit, and performs calculation to make the result of the addition of the adding unit 351 ½. In this manner, the resolution converting unit 35 adds together pixel values of two horizontally adjacent pixels, and performs image reduction to make the result of the addition ½. Accordingly, an image output from the resolution converting unit 35 can keep its aspect ratio even if signals from a plurality of pixels are added together and read out at the image capturing unit so as to enable an operation at a high frame rate, and to enhance the S/N ratio of pixel signals. Note that although, in an example illustrated in FIG. 22, a plurality of adders are provided in the adding unit 351, and in the multiplying unit 352, dividers are provided for each adder in the adding unit 351, one adder, and one divider may be provided, and a process of generating a pixel signal of one pixel from pixel signals of two pixels may be performed in the horizontal direction sequentially line by line.

Note that although, in the above-mentioned embodiments, a case is illustrated in which primary-color color filters are used to constitute an image capturing unit, complementary-color color filters may be used to constitute an image capturing unit. In addition, non-polarization pixels are not limited to those constituted by color component pixels, but may include white pixels, infrared pixels that are sensitive to light in the infrared band, and the like, for example.

In addition, a series of processing described in the specification can be executed by hardware, software, or a composite configuration of both hardware and software. In a case where the series of processing is executed by software, a program in which a process sequence is recorded is installed into a memory in a computer incorporated in a dedicated hardware, and is executed. Alternatively, a program can be installed into a general-purpose computer that can execute various types of processing, and be executed.

For example, the program can be recorded in advance in a hard disk, an SSD (Solid State Drive), or a ROM (Read Only Memory) as a recording medium. Alternatively, the program can be stored (recorded) in a transitory manner or in a non-transitory manner in a removable recording medium such as a flexible disk, a CD-ROM (Compact Disc Read Only Memory), an MO (Magneto optical) disk, a DVD (Digital Versatile Disc), a BD (Blu-Ray Disc (registered trademark)), a magnetic disk, or a semiconductor memory card. Such a removable recording medium can be provided as a so-called packaged software.

In addition, other than being installed into a computer from a removable recording medium, the program may be transferred from a download site through wires or wirelessly to a computer via networks such as LANs (Local Area Networks) or the Internet. The computer can receive the program transferred in such a manner, and install the program in a recording medium such as a built-in hard disk.

Note that the effects described in the present specification are illustrated merely as examples, but are not restrictive, and there may be additional effects which are not described. In addition, interpretation of the present technique should not be limited by the above-mentioned embodiments of the technique. The embodiments of this technique disclose the present technique in exemplary forms, and it is obvious that those skilled in the art can make modifications or use alternative means in the embodiments without deviating from the gist of the present technique. That is, claims should be taken into consideration in order to determine the gist of the present technique.

In addition, the image capturing device of the present technique can also take the following configurations.

(1) An image capturing device including:
an image capturing unit having an imaging element with a 4×4-pixel area in which pixels including at least one pixel of every color component of a plurality of color components are polarization pixels of a same polarization direction, and pixels which are not the polarization pixels constitute a majority of the 4×4-pixel area, and are non-polarization pixels; and
an image processing unit which uses pixel signals of the polarization pixels, and pixel signals of the non-polarization pixels that are generated in the image capturing unit to calculate at least either unpolarized components or diffuse reflection components for each pixel.

(2) The image capturing device according to (1), in which the image processing unit calculates the unpolarized components, and the diffuse reflection components, and calculates specular reflection components on a basis of the calculated unpolarized components and diffuse reflection components.

(3) The image capturing device according to (2), in which the image processing unit calculates, for each color component, at least either the unpolarized components or the diffuse reflection components, or the unpolarized components, the diffuse reflection components, and the specular reflection components.

(4) The image capturing device according to (3), in which the image processing unit performs filtering by using the pixel signals, and calculates, for each pixel, for each color component, low frequency components, calculates, for each pixel position, high frequency component information on the basis of pixel signals, and low frequency components of same color components as color components of the pixels, and calculates, for each color component, the unpolarized components, and the diffuse reflection components from the high frequency component information calculated for each pixel position, and the low frequency components for each color component.

(5) The image capturing device according to (3), in which the image processing unit performs interpolation by using pixel signals of non-polarization pixels of same colors as colors of polarization pixels, and calculates unpolarized components of the polarization pixels, and performs interpolation by using pixel signals of polarization pixels of same colors as colors of the non-polarization pixels, and calculates diffuse reflection components of the non-polarization pixels.

(6) The image capturing device according to any one of (2) to (5), in which the image processing unit adjusts a component amount of at least either the diffuse reflection components or the specular reflection components, and combines the diffuse reflection components and the specular reflection components.

(7) The image capturing device according to (6), in which the image processing unit lowers a component amount of the specular reflection components, and combines the specular reflection components.

(8) The image capturing device according to (6), in which the image processing unit performs adjustment of a component amount of only the diffuse reflection components.

(9) The image capturing device according to (6), in which the image processing unit performs object recognition by using the unpolarized components or the diffuse reflection components, and performs adjustment of a component amount of at least either the diffuse reflection components or the specular reflection components for each recognized object area.

(10) The image capturing device according to any one of (1) to (9), in which the image capturing unit performs generation of a pixel signal by adding signals from pixels of the same polarization characteristic and color component, and the image processing unit performs image reduction corresponding to the number of the pixels for which the addition of signals has been performed, in a direction orthogonal to an array direction of the pixels for which the addition of the signals has been performed.

(11) The image capturing device according to any one of (1) to (10), in which an object to be captured by the image capturing unit is irradiated with polarization light of a polarization direction orthogonal to a polarization direction of polarization pixels of the imaging element.

(12) The image capturing device according to (11), further including:

an illuminating unit performing irradiation with the polarization light.

INDUSTRIAL APPLICABILITY

According to this technique, in a 4×4-pixel area an imaging element, pixels including at least one pixel of every color component of a plurality of color components are polarization pixels of the same polarization direction, the majority of pixels in the 4×4-pixel area are non-polarization pixels, and pixel signals of the polarization pixels, and pixel signals of the non-polarization pixels are used to calculate unpolarized components and diffuse reflection components for each pixel. Because of this, non-polarization images with high resolution and sensitivity, and color component-by-color component reflection components can be acquired. Accordingly, it is suited for: image capturing devices having a function of adjusting object images; an electronic device having a function of performing image processing by using image signals generated at an image capturing unit; and the like.

REFERENCE SIGNS LIST

10: Image capturing device
20, 20-1, 20-2, 20-3, 20-4, 20-5: Image capturing unit
21: Sensor unit
22, 42: Polarizer
30: Image processing unit
31: Unpolarized component calculating unit
32: Diffuse reflection component calculating unit
33: Specular reflection component calculating unit
34: Reflection component adjusting unit
35: Resolution converting unit
351: Adding unit
352: Dividing unit
40: Illuminating unit
41: Light source

The invention claimed is:

1. An image capturing device comprising:
an image capturing unit having an imaging element with a 4×4-pixel area in which pixels including at least one pixel of every color component of a plurality of color components are polarization pixels of a same polarization direction, and pixels which are not the polarization pixels constitute a majority of the 4×4-pixel area, and are non-polarization pixels; and
an image processing unit which uses pixel signals of the polarization pixels, and pixel signals of the non-polarization pixels that are generated in the image capturing unit to calculate at least either unpolarized components or diffuse reflection components for each pixel.

2. The image capturing device according to claim 1, wherein the image processing unit calculates the unpolarized components, and the diffuse reflection components, and calculates specular reflection components on a basis of the calculated unpolarized components and the diffuse reflection components.

3. The image capturing device according to claim 2, wherein the image processing unit calculates, for each color component, at least either the unpolarized components or the diffuse reflection components, or the unpolarized components, the diffuse reflection components, and the specular reflection components.

4. The image capturing device according to claim 3, wherein the image processing unit performs filtering by using the pixel signals, and calculates, for each pixel, for each color component, low frequency components, calculates, for each pixel position, high frequency component information on a basis of the pixel signals, and low frequency components of same color components as color components of the pixels, and calculates, for each color component, the unpolarized components, and the diffuse reflection components from the high frequency component information calculated for each pixel position, and the low frequency components for each color component.

5. The image capturing device according to claim 3, wherein the image processing unit performs interpolation by using pixel signals of non-polarization pixels of same colors as colors of polarization pixels, and calculates unpolarized components of the polarization pixels, and performs interpolation by using pixel signals of polarization pixels of same colors as colors of the non-polarization pixels, and calculates diffuse reflection components of the non-polarization pixels.

6. The image capturing device according to claim 2, wherein the image processing unit adjusts a component amount of at least either the diffuse reflection components or the specular reflection components, and combines the diffuse reflection components and the specular reflection components.

7. The image capturing device according to claim 6, wherein the image processing unit lowers a component amount of the specular reflection components, and combines the specular reflection components.

8. The image capturing device according to claim 6, wherein the image processing unit performs adjustment of a component amount of only the diffuse reflection components.

9. The image capturing device according to claim 6, wherein the image processing unit performs object recognition by using the unpolarized components or the diffuse reflection components, and performs adjustment of the component amount of at least either the diffuse reflection components or the specular reflection components for each recognized object area.

10. The image capturing device according to claim 1, wherein the image capturing unit performs generation of a pixel signal by adding signals from pixels of a same polarization characteristic and color component, and the image processing unit performs image reduction corresponding to a number of the pixels for which the addition of signals has been performed, in a direction orthogonal to an array direction of the pixels for which the addition of the signals has been performed.

11. The image capturing device according to claim 1, wherein an object to be captured by the image capturing unit is irradiated with polarization light of a polarization direction orthogonal to a polarization direction of the polarization pixels of the imaging element.

12. The image capturing device according to claim 11, further comprising:
an illuminating unit performing irradiation with the polarization light.

13. An imaging element having a pixel area constituted by using pixels of a plurality of color components, the pixel area being provided with a 4×4-pixel area in which the pixels including at least one pixel of every color component of the plurality of color components are polarization pixels of a same polarization direction, and pixels which are not the polarization pixels constitute a majority of the 4×4-pixel area, and are non-polarization pixels.

14. The imaging element according to claim 13, wherein the 4×4-pixel area is provided repetitively in the pixel area.

15. The imaging element according to claim 14, wherein the 4×4-pixel area is provided repetitively at predetermined intervals.

16. The imaging element according to claim 13, wherein a 2×2-pixel area in the 4×4-pixel area is constituted by the polarization pixels of the same polarization direction including a pixel of every color component.

17. The imaging element according to claim 13, wherein four 2×2-pixel areas included in the 4×4-pixel area are constituted by pixels of every color component, and one pixel in each of the 2×2-pixel areas is one of the polarization pixels.

18. The imaging element according to claim 13, wherein each 2×2-pixel area of four 2×2-pixel areas included in the 4×4-pixel area is constituted by pixels of a same color component.

19. The imaging element according to claim 18, wherein the polarization pixels are provided dispersedly or adjacently.

20. An image processing method comprising:
acquiring pixel signals of polarization pixels, and pixel signals of non-polarization pixels from an image capturing unit having an imaging element with a 4×4-pixel area in which pixels including at least one pixel of every color component of a plurality of color components are the polarization pixels of a same polarization direction, and pixels which are not the polarization pixels constitute a majority of the 4×4-pixel area, and are the non-polarization pixels; and
using the pixel signals of the polarization pixels, and the pixel signals of the non-polarization pixels that are acquired from the image capturing unit to calculate at least either unpolarized components or diffuse reflection components for each pixel.

* * * * *